US008866855B2

(12) United States Patent
Funabashi et al.

(10) Patent No.: US 8,866,855 B2
(45) Date of Patent: Oct. 21, 2014

(54) ELECTRONIC DEVICE, METHOD OF DISPLAYING DISPLAY ITEM, AND SEARCH PROCESSING METHOD

(71) Applicant: Sony Computer Entertainment Inc., Tokyo (JP)

(72) Inventors: Yoshimitsu Funabashi, Tokyo (JP); Shunsuke Kunieda, San Francisco, CA (US)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/744,936

(22) Filed: Jan. 18, 2013

(65) Prior Publication Data

US 2013/0127921 A1 May 23, 2013

Related U.S. Application Data

(63) Continuation of application No. PCT/JP2011/004174, filed on Jul. 25, 2011.

(30) Foreign Application Priority Data

Jul. 30, 2010 (JP) ................................. 2010-172621
Jul. 30, 2010 (JP) ................................. 2010-172622

(51) Int. Cl.
*G09G 5/00* (2006.01)
*G06F 3/0485* (2013.01)
*G06F 3/0488* (2013.01)
*G06Q 20/12* (2012.01)

(52) U.S. Cl.
CPC .............. *G09G 5/006* (2013.01); *G06F 3/0485* (2013.01); *A63F 2300/552* (2013.01);
(Continued)

(58) Field of Classification Search
CPC ..... G06F 3/0481; G06F 3/0485; G06T 11/00; G06T 19/00; G09G 2320/0261
USPC .......... 345/672, 677; 707/722, 723, 731, 732; 715/783
See application file for complete search history.

(56) References Cited

U.S. PATENT DOCUMENTS 8,112,404 B2 * 2/2012 Huynh et al. ................. 707/705
2008/0270379 A1 * 10/2008 Ramakrishna .................... 707/5
(Continued)

FOREIGN PATENT DOCUMENTS

JP 2005316523 A 11/2005
JP 2006047873 A 2/2006
(Continued)

OTHER PUBLICATIONS

Office Action for corresponding JP Patent Application No. 2010-172621, dated May 7, 2013.

(Continued)

*Primary Examiner* — Xiao Wu
*Assistant Examiner* — Todd Buttram
(74) *Attorney, Agent, or Firm* — Matthew B. Dernier, Esq.; Gibson & Dernier LLP

(57) ABSTRACT

An acquisition unit acquires a content image corresponding to content. A content image display unit arranges a plurality of content images side by side in a display screen image, and a related information display unit displays information related to an arranged content image. A first reception unit acquires a first moving instruction for the content images arranged side by side, and a second reception unit acquires a second moving instruction for the content images arranged side by side. The content image display unit moves the content images according to a moving instruction acquired by the first reception unit or the second reception unit. A related information display unit displays different types of related information when the first reception unit acquires the first moving instruction and when the second reception unit acquires the second moving instruction.

7 Claims, 20 Drawing Sheets

(52) U.S. Cl.
CPC ....... *A63F 2300/5513* (2013.01); *G06F 3/0488* (2013.01); *A63F 2300/308* (2013.01); *G06Q 20/123* (2013.01)
USPC .......... 345/672; 345/677; 707/722; 707/723; 707/731; 707/732; 715/783

(56) References Cited

U.S. PATENT DOCUMENTS

| | | | |
|---|---|---|---|
| 2009/0119589 A1* | 5/2009 | Rowell et al. | 715/716 |
| 2009/0210824 A1* | 8/2009 | Kawamura | 715/828 |
| 2010/0223134 A1* | 9/2010 | Lunenfeld | 705/14.54 |
| 2011/0167341 A1* | 7/2011 | Cranfill et al. | 715/702 |

FOREIGN PATENT DOCUMENTS

| | | |
|---|---|---|
| JP | 200734983 A | 2/2007 |
| JP | 200871117 A | 3/2008 |

OTHER PUBLICATIONS

International Search Report for corresponding PCT Application No. PCT/JP2011/004174, dated Oct. 18, 2011.
International Preliminary Report on Patentability for corresponding PCT Application No. PCT/JP2011/004174, dated Feb. 5, 2013.
Office Action for corresponding JP Patent Application No. 2013-111156, dated Mar. 4, 2014.

* cited by examiner

FIG.11

| GAME TITLE | LINK INFORMATION | DOWNLOAD DATE AND TIME | LAST PLAYED DATE AND TIME | TITLE INITIAL LETTER |
|---|---|---|---|---|
| JKL fishing | /game/··· | 2009/*/** | 2010/*/** | J |
| DEF Tennis | /game/··· | 2010/*/** | 2010/*/** | D |
| KLM Quiz | /game/··· | 2010/*/** | 2010/*/** | K |
| ··· | ··· | ··· | ··· | ··· |

ELECTRONIC DEVICE, METHOD OF DISPLAYING DISPLAY ITEM, AND SEARCH PROCESSING METHOD

BACKGROUND OF THE INVENTION

1. Field of Invention

The present invention relates to an electronic device, and particularly to an electronic device provided with an information processing function.

2. Description of the Related Art

Conventionally, electronic devices such as portable game devices, PDA's (Personal Digital Assistant), and the like are widely used. In recent years, multifunctional electronic devices such as, e.g., smartphones have been introduced in which functions of portable phones, PDA's, and the like are put together into one. Such electronic devices are provided with a large-capacity memory and a high-speed processor, and the user can enjoy various applications by downloading content such as game software, music, movies, and the like.

Electronic devices having touch panels provide an excellent user interface that allows the user to perform an intuitive operation. For example, user interfaces and the like are already in practical use that allow a displayed content image (icon) to be tapped using a finger so as to select the icon or that allow a display image to be scrolled by tracing the surface of a panel using a finger.

An electronic device having a touch panel usually provides one type of user interface for a single process. With regard to a scrolling process, a user interface is already in practical use that allows the surface of a panel to be traced using a finger in a direction in which the user wishes to move a display image. Thus, an electronic device provides such a user interface to the user while being equipped with the user interface. However, when many icons are to be displayed, a scrolling process must be repeated until a target icon is displayed, and it sometimes takes time. In particular, there is a fact that the number of icons to be displayed is growing since large-capacity memories allow electronic devices to store many items of content.

The inventors of the present invention have conceived of a possibility of achieving an efficient scrolling operation by providing several different types of user interfaces with different amounts of scrolling. In that case, the same scrolling display may be provided for all the types of user interfaces. However, in order for the user to efficiently search for a target icon, it is preferred to provide, based on the difference in the amount of scrolling, scrolling display with visibility devised for each type of user interface.

An electronic device of recent years has a wireless communication function and is provided with a large-capacity memory that allows for the downloading of various items of content to the memory after accessing an external content server. Therefore, an electronic device is preferably capable of searching for content stored in a server or content downloaded in a memory efficiently. Also, an electronic device is capable of effectively presenting search results to the user, preferably.

SUMMARY OF THE INVENTION

Accordingly, a purpose of the present invention is to provide an electronic device capable of realizing display in a process of moving (scrolling) a content image efficiently. Another purpose of the present invention is to provide an electronic device capable of performing a search process efficiently.

An electronic device according to one embodiment of the present invention comprises: an acquisition unit configured to acquire data of a display item corresponding to content; and a display control unit configured to generate an image to be displayed on a display. The display control unit has: a first display unit configured to arrange a plurality of display items side by side; a second display unit configured to display information related to a display item arranged by the first display unit; a first reception unit configured to acquire a first moving instruction for the display items arranged side by side; and a second reception unit configured to acquire a second moving instruction for the display items arranged side by side. The first display unit moves the display items on the display according to a moving instruction acquired by the first reception unit or the second reception unit, and the second display unit displays different related information for the same display item arranged by the first display unit when the first reception unit acquires the first moving instruction and when the second reception unit acquires the second moving instruction.

Another embodiment of the present invention relates to a method of displaying a display item. The method comprises: acquiring data of a display item corresponding to content; and generating an image to be displayed on a display. The generation of the image has: arranging a plurality of display items side by side; displaying information related to an arranged display item; acquiring a first moving instruction for the display items arranged side by side; and acquiring a second moving instruction for the display items arranged side by side. The arrangement of the plurality of display items includes moving the display items on the display according to an acquired moving instruction. In the display of the related information, different related information is displayed for the same display item when the first moving instruction is acquired and when the second moving instruction is acquired.

Yet another embodiment of the present invention relates to an electronic device having a communication function comprising: a memory unit configured to store content data; a communication unit configured to connect to a server; a reception unit configured to receive a content search instruction; a search processing unit configured to search the memory unit and allow the server to perform a search via the communication unit, in accordance with the search instruction received by the reception unit; and a display control unit configured to display a search result of the memory unit and a search result of the server in different display areas.

Still another embodiment of the present invention relates to a search processing method. The method comprises: connecting to a server; receiving a content search instruction; searching a memory unit for storing content data and allowing the connected server to perform a search, in accordance with the received search instruction; and displaying a search result of the memory unit and a search result of the server in different display areas.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 11 is a diagram illustrating a content table;

DETAILED DESCRIPTION OF THE INVENTION

The invention will now be described by reference to the preferred embodiments. This does not intend to limit the scope of the present invention, but to exemplify the invention.

Figure 1:
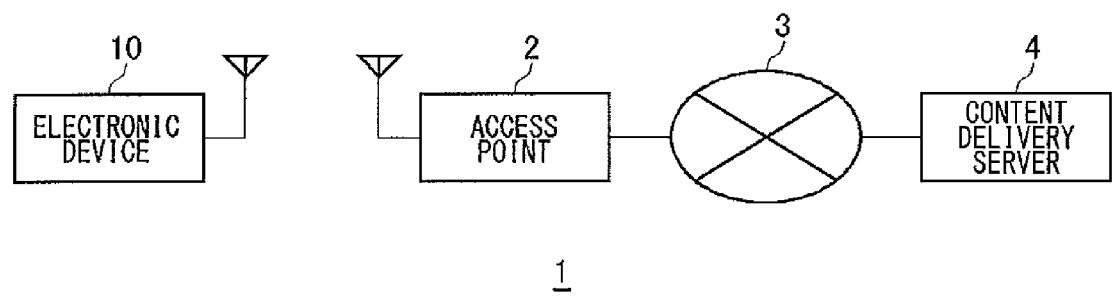
FIG. 1 is a diagram illustrating the configuration of a content providing system according to an exemplary embodiment.

FIG. 1 illustrates the configuration of a content providing system 1 according to an exemplary embodiment. In the content providing system 1, an electronic device 10 and a content delivery server 4 are connected via a network 3 such as the Internet in a manner such that the electronic device 10 and the content delivery server 4 can communicate with each other. The electronic device 10 transmits to the content delivery server 4 a content search instruction or a content acquisition request. The content delivery server 4 transmits to the electronic device 10 content search results, content data, a content list, a content image, or the like. The content delivery server 4 may be composed of a plurality of servers. A content image is an image that corresponds to content and may be, for example, a package image of the content. A content image may be included in content data. The electronic device 10 has a wireless communication function and connects to the network 3 via an access point 2.

The electronic device 10 according to the present exemplary embodiment has a communication function in a wireless LAN (Local Area Network) method. Alternatively, the electronic device 10 may have a communication function in another wireless communication method or may be configured such that the electronic device 10 connects to an external apparatus via a wired cable such as a USB cable so as to communicate with the external apparatus.

The access point 2 connects the electronic device 10 to another access point via a wireless LAN or functions as a relay apparatus that connects the electronic device 10 to the network 3 such as the Internet or a wired LAN. When the electronic device 10 has a wire communication function, the electronic device 10 can connect to the content delivery server 4 by using, e.g., a PC (personal computer) or the like connected to the network 3 as a relay apparatus.

Figure 2A:
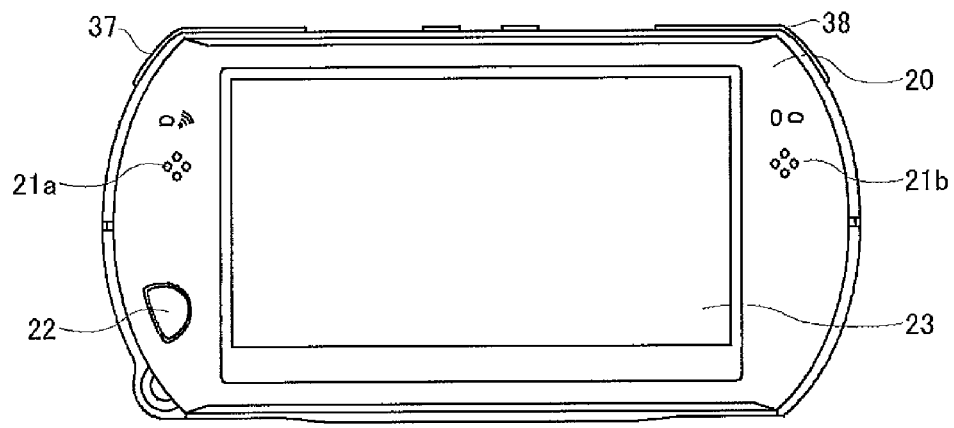
FIGS. 2A and 2B are diagrams illustrating the exterior configuration of an electronic device.
Figure 2B:
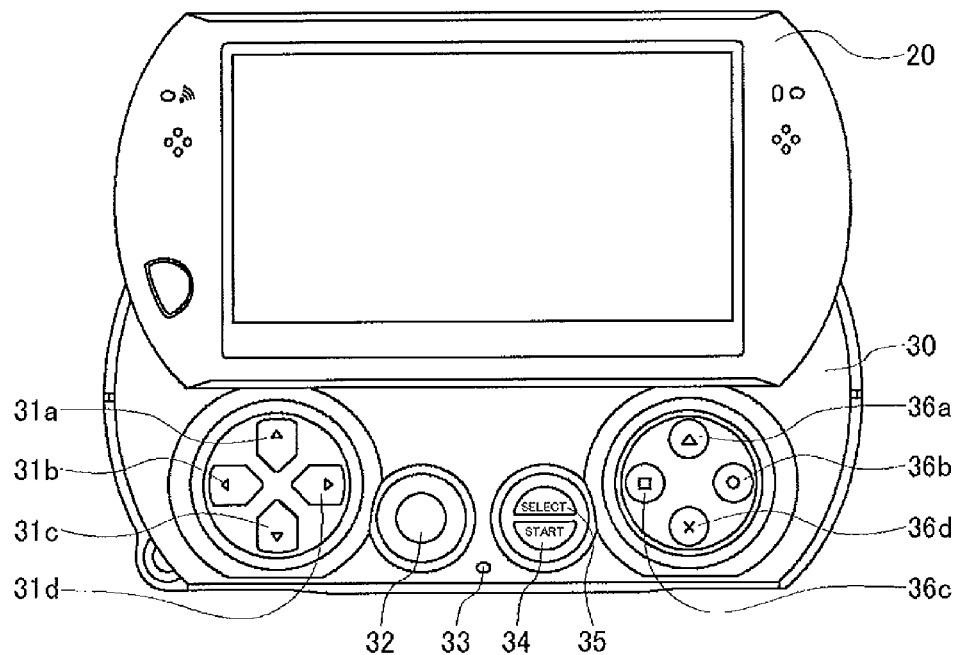

FIGS. 2A and 2B illustrate the exterior configuration of a portable electronic device 10 according to the present embodiment. The electronic device 10 is provided with an upper housing 20 and a lower housing 30 that are slidably connected. FIG. 2A is a front view when the electronic device 10 is in a closed state, and FIG. 2B is a front view when the electronic device 10 is in an open state. In the state where the electronic device 10 is closed, the upper housing 20 almost completely overlaps the lower housing 30 above the lower housing 30, and operation keys provided on the front surface of the lower housing 30 are not exposed to the outside. An L button 37 and an R button 38 are provided on the upper surface of the lower housing 30. When the lower housing 30 is slid against the upper housing 20 from the closed state, the electronic device 10 becomes open exposing the operation keys provided on the front surface of the lower housing 30 to the outside. Regardless of whether the electronic device 10 is in the open state or in the closed state, the user is capable of operating the L button 37 and the R button 38.

On the front surface of the upper housing 20, a left speaker 21a, a right speaker 21b, an operation button 22, and a touch panel 23 are provided. A slide mechanism (not shown) that slidably connects the upper housing 20 and the lower housing 30 is provided between the back surface of the upper housing 20 and the front surface of the lower housing 30.

In an open state shown in FIG. 2B, directional keys 31a, 31b, 31c, and 31d (hereinafter, generically referred to as "directional keys 31"), an analog pad 32, a microphone 33, a START button 34, a SELECT button 35, operation buttons 36a, 36b, 36c, and 36d (hereinafter, generically referred to as "operation buttons 36") that are provided on the front face of the lower housing 30 are exposed to the outside. The operation keys such as the directional keys 31, the analog pad 32, the START button 34, the SELECT button 35, and the operation buttons 36 become operable when the electronic device 10 becomes open.

The electronic device 10 may be a mobile phone provided with a PDA function. In addition to a call function, the electronic device 10 is configured to have a function of executing game software and/or a function of reproducing music, movies, etc., by installing a predetermined application program. Programs used to realize these functions may be already installed by the time an electronic device 10 is shipped from the factory.

Figure 3:
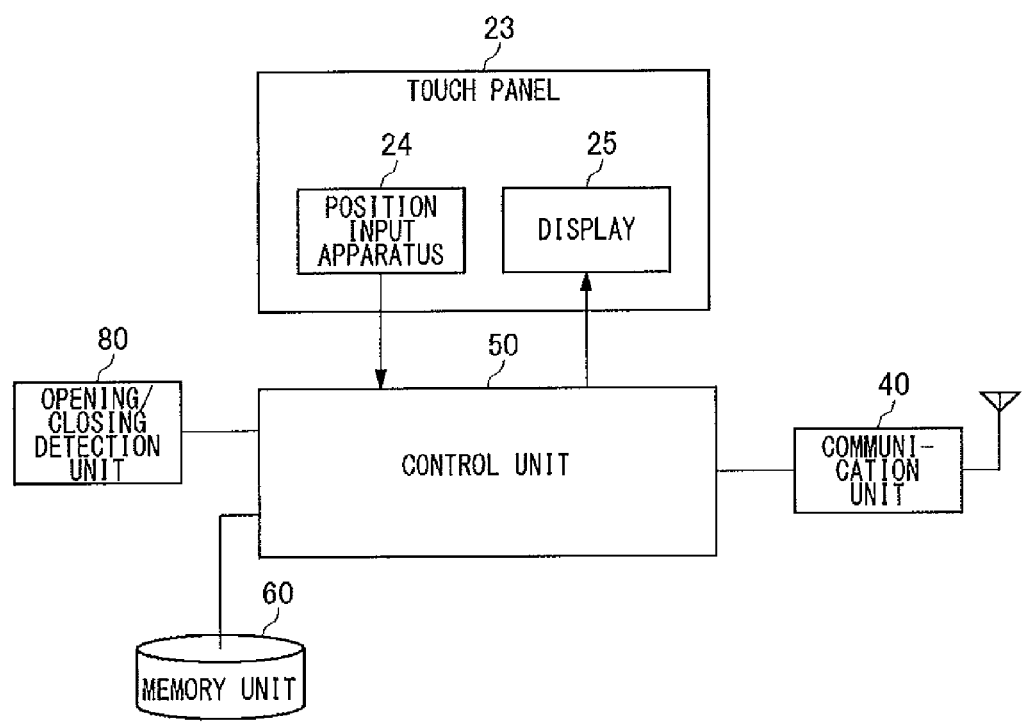
FIG. 3 is a diagram illustrating the entire configuration of functional blocks of the electronic device.

FIG. 3 illustrates the entire configuration of functional blocks of the electronic device 10. An opening/closing detection unit 80 detects a transition of the state of the electronic device 10 from an open state to a closed state or from the closed state to the open state. The opening/closing detection unit 80 transmits to a control unit 50 transition information with a signal value of "0" when the electronic device 10 transitions from the open state to the closed state and transmits to the control unit 50 transition information with a signal value of "1" when the electronic device 10 transitions from the closed state to the open state.

The touch panel 23 is configured with a position input apparatus 24 and a display 25, which are connected to the control unit 50. The display 25 is capable of displaying various types of information based on a signal transmitted from the control unit 50 and displays a content search screen image, a content icon (hereinafter, also referred to as a "content image"), or the like based on an instruction from the user. The position input apparatus 24 is, for example, a touchpad and transmits to the control unit 50 position information regarding a touched part on the touch panel 23 based on a touch operation by a finger or a stylus pen. For the position input apparatus 24, various input detection methods such as a resistance film method and an electrostatic capacitance method can be employed. The control unit 50 performs a search process, a process of generating a display screen image, and the like and writes data to and/or reads data from a memory unit 60 as necessary. The memory unit 60 may be a hard disk drive (HDD), a random access memory (RAM), or the like. A communication unit 40 realizes a communication function and connects to the content delivery server 4 via the network 3.

The content delivery server 4 stores fee-based or charge-free content data. If the content is application software, the content data is configured to include a program for executing the application, a content image and content information that correspond to the application, and the like. For example, if the content is a movie, the content data is configured to include compressed moving image data, a content image and content information that correspond to the movie, and the like. An example of a procedure of downloading content data is shown in the following.

Figure 4:
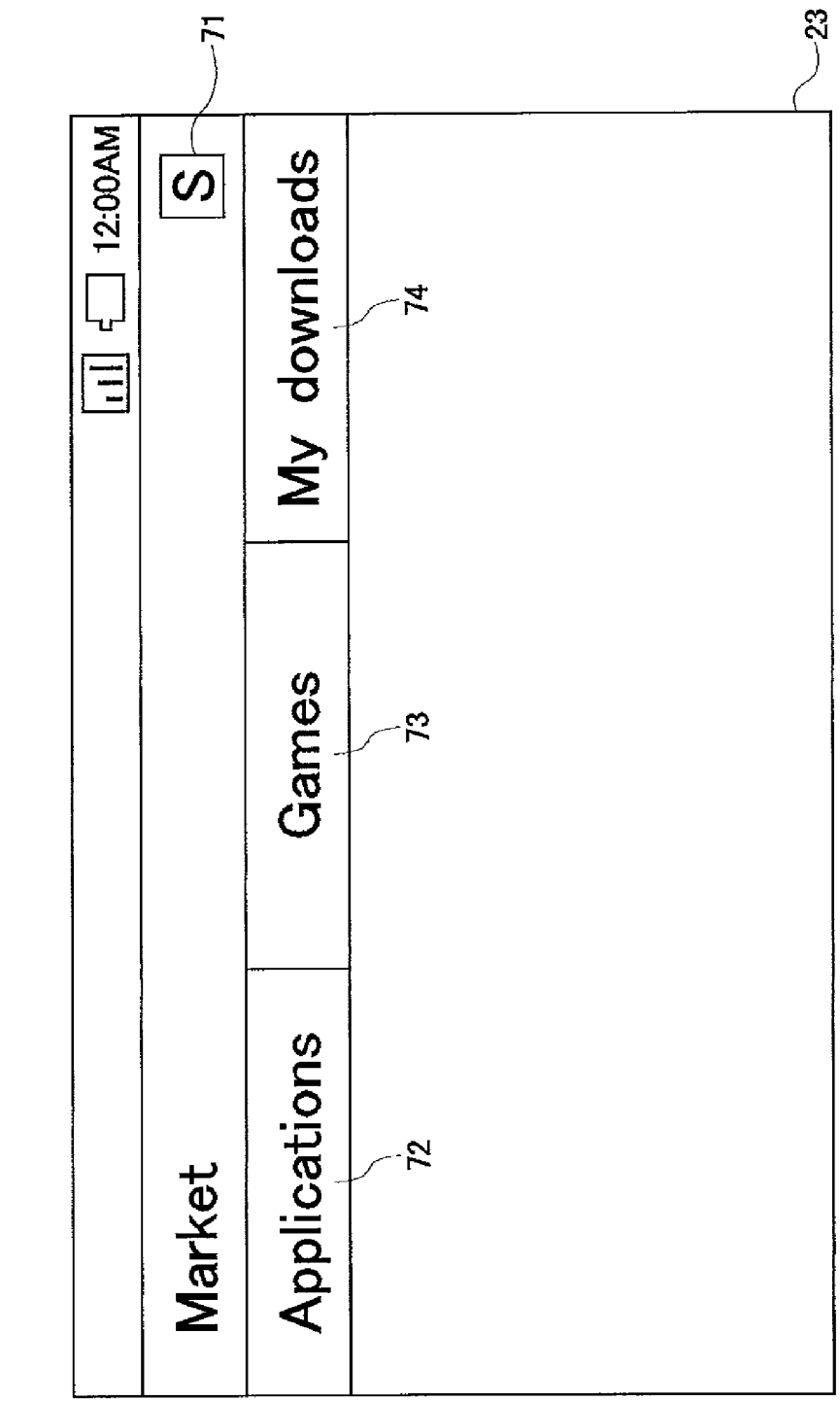
FIG. 4 is a diagram illustrating a menu screen image provided by a content delivery server.

When the electronic device 10 accesses the content delivery server 4, a menu screen image is displayed on the touch panel 23. FIG. 4 illustrates a menu screen image provided by the content delivery server 4. A plurality of tabs 72, 73, and 74 are displayed on the menu screen image. When the user presses (taps) the tab 72 with his/her finger, the content delivery server 4 provides to the electronic device 10 information regarding an application (other than game software) that can be provided. When the user taps the tab 73, the content delivery server 4 provides to the electronic device 10 information regarding game software that can be provided. When the user taps the tab 74, the content delivery server 4 provides to the electronic device 10 a list of applications and game software that have been already downloaded by the user. A search button 71 is provided to search for a desired application or desired game software.

Figure 5:
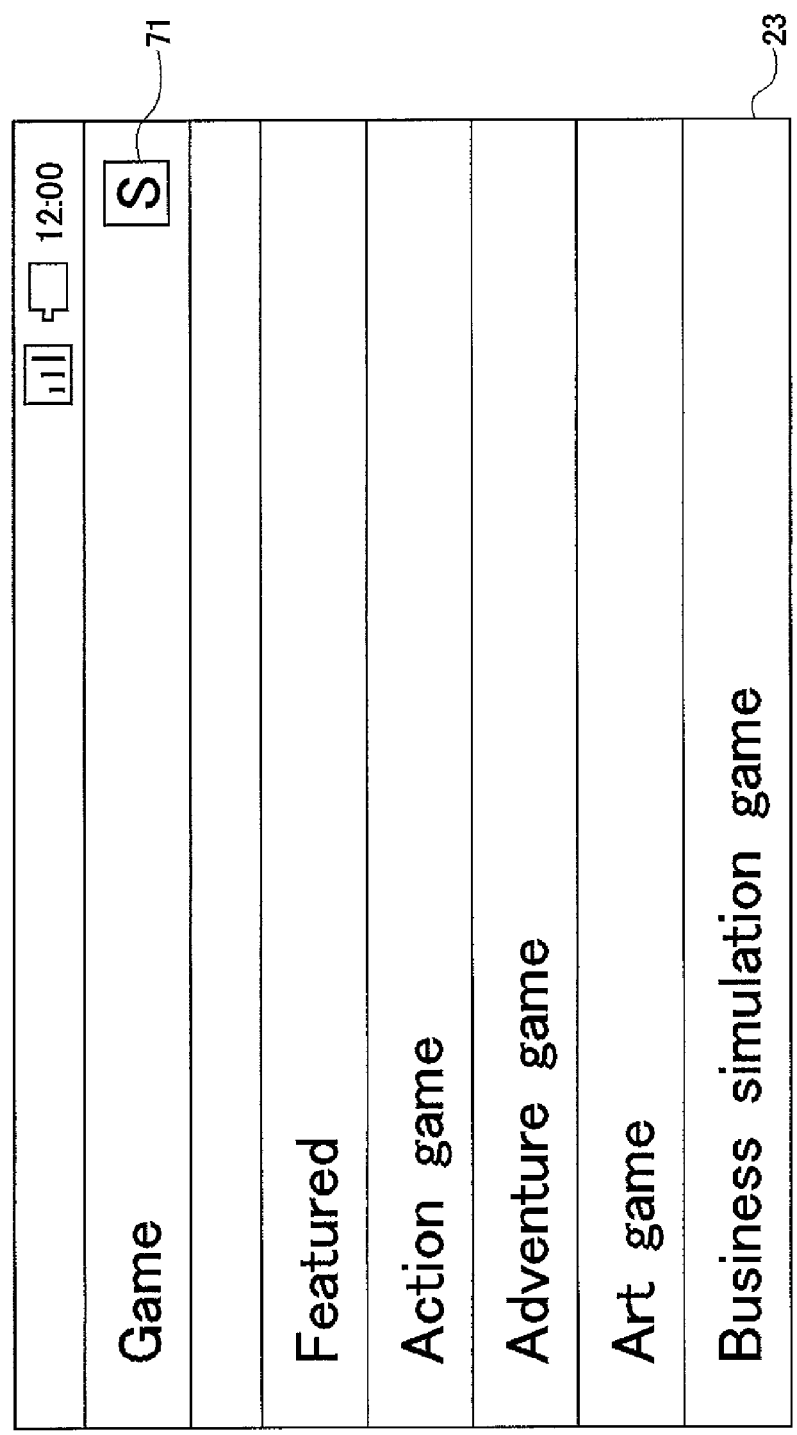
FIG. 5 is a diagram illustrating a list screen image of game categories.

When the user taps the tab 73, a list screen image of game categories shown in FIG. 5 is displayed on the touch panel 23. This list screen image displays a list of game categories, and the user taps the display area of a category of game software the user wishes to download. If the title of a game is already known, the user may open a search screen image by tapping the search button 71 on the menu screen image shown in FIG. 4 or on the list screen image shown in FIG. 5 so as to enter the game title.

Figure 6:
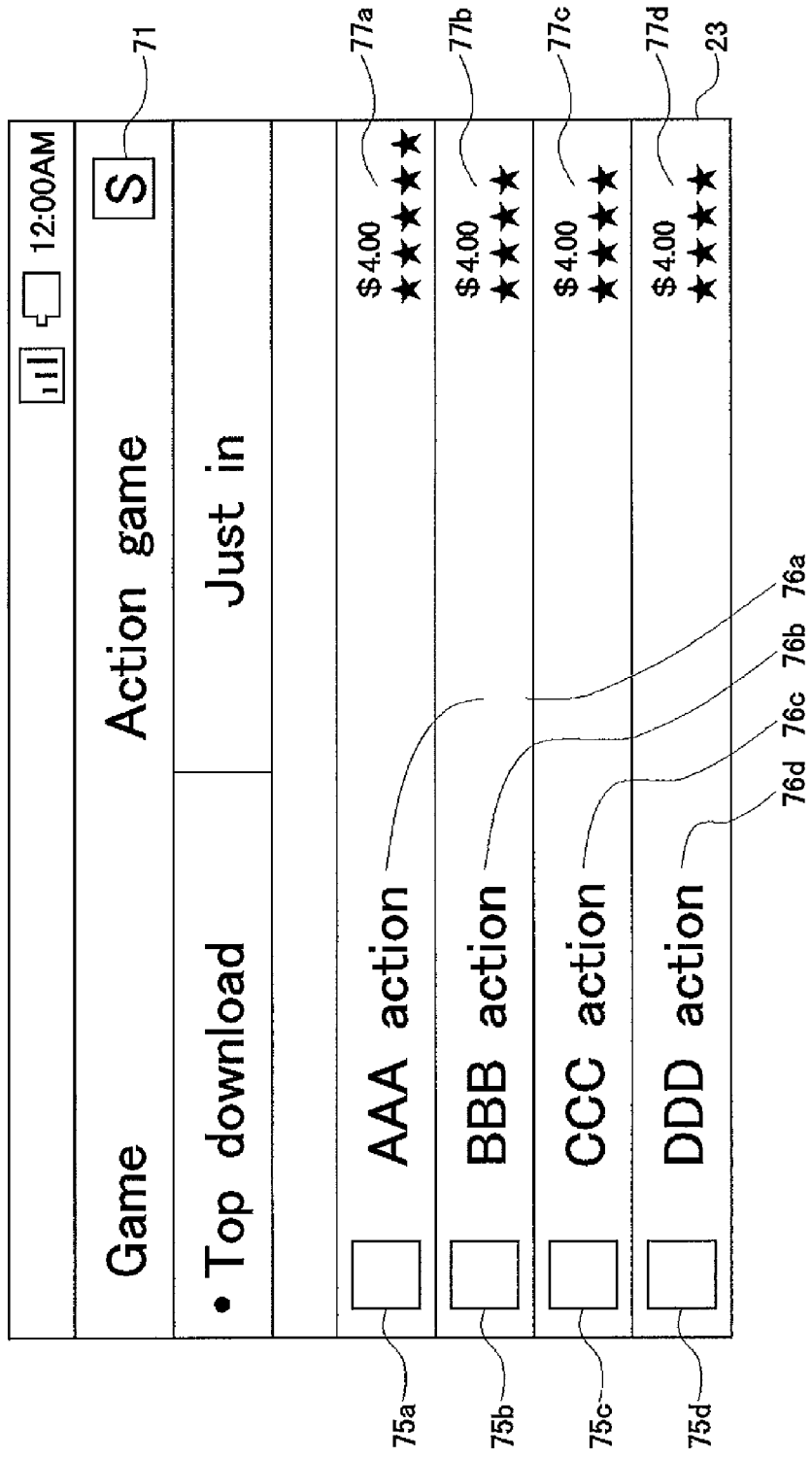
FIG. 6 is a diagram illustrating a list screen image of game software.

When the user taps the display area of "Action game", a list screen image of game software items shown in FIG. 6 is displayed on the touch panel 23. On this list screen image, a list of game software items that belong to the category of "Action game" is displayed. As information for identifying games, package images 75a through 75d, game titles 76a through 76d, and prices 77a through 77d are displayed in respective rows. A picture of stars is added for each item of game software. The number of stars represents an average rating made by users who have already downloaded the game software. The larger the number of stars, the better the popularity of the game software.

Figure 7:
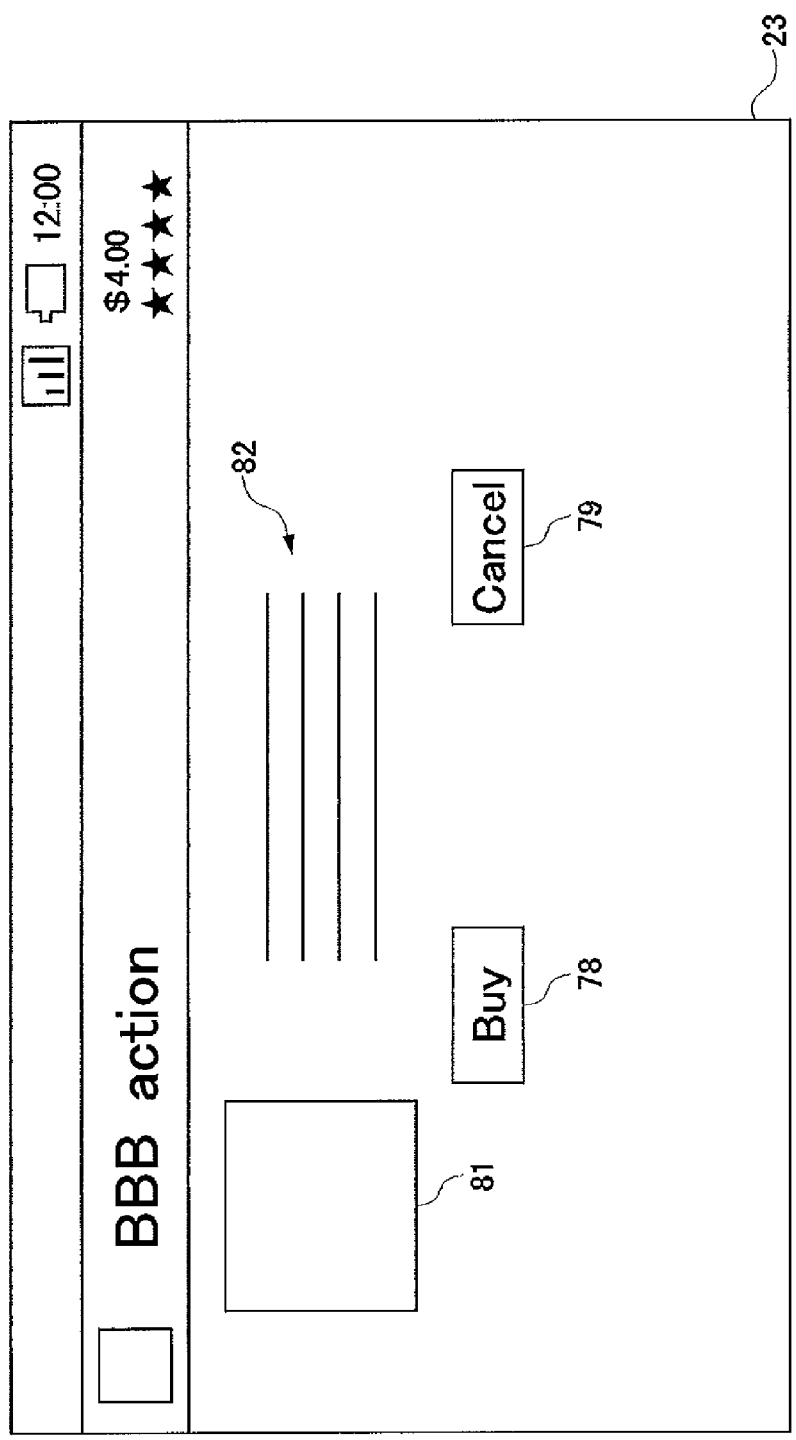
FIG. 7 is a diagram illustrating a content purchase screen image.

When the user taps the display area of a game title "BBB action", a purchase screen image shown in FIG. 7 is displayed on the touch panel 23. On the purchase screen image, a purchase button 78 and a cancel button 79, which can be operated by the user, are displayed along with a package image 81 and detailed information 82. When the user taps the purchase button 78, the content delivery server 4 performs a billing process and transmits game software data of the title "BBB action" to the electronic device 10. The communication unit 40 receives the game software data, and the control unit 50 stores the game software data in the memory unit 60.

In the content providing system 1 according to the present exemplary embodiment, the electronic device 10 is provided with a content management application for performing a process of displaying a content image and a search process. The content management application performs a process of displaying a content image and a process of searching content.

As explained in association with FIGS. 4-7, the electronic device 10 can download content data by connecting to the content delivery server 4. The content management application plays a role of supporting content download by performing a process of displaying a content image and a process of searching content. An explanation is given in the following on the assumption that the content management application performs a process of displaying a package image of game software and a process of searching game software. Content to be managed is not limited to games and may be music, movies, and the like. Content to be managed may even be a name or phone number in a phone book, a picture that has been captured, a document file that has been generated, a product in a shopping site, etc. In the present exemplary embodiment, content needs to be those whose corresponding display items can be arranged on a display, and a display item may be an image or text. An example is shown in the following where a display item is a package image of game software. If a phone book is to be displayed, the display item is a name described in text, a phone number, or an image such as a picture and an avatar. If a document file is to be displayed, the display item is a file name described in text. If the content to be displayed is music, the display item is an image of a jacket thereof. If the content is a movie, the display item is an image of a package thereof. If the content is a book, the display item is an image of a cover thereof. Upon receiving, from the opening/closing detection unit 80, transition information with a signal value of "1" indicating that the electronic device 10 has transitioned from the closed state to the open state, system software that is installed in the control unit 50 starts the content management application.

<Process of Displaying Content Image>

Figure 8:
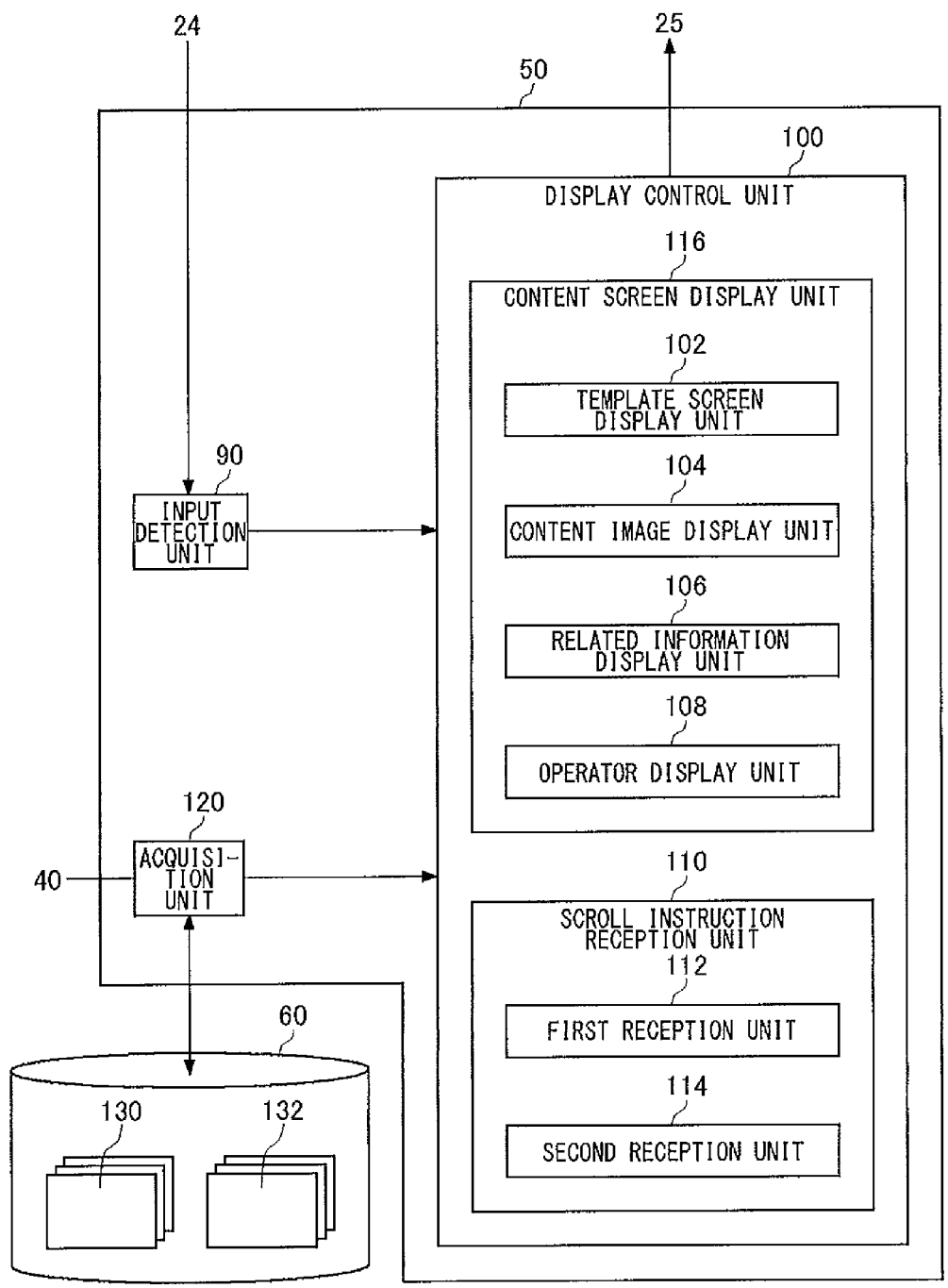
FIG. 8 is a diagram illustrating functional blocks of a control unit that performs a process of displaying a content image.

FIG. 8 illustrates functional blocks of the control unit 50 that performs a process of displaying a content image. The control unit 50 is provided with an input detection unit 90, a display control unit 100, and an acquisition unit 120. The input detection unit 90 detects screen position information transmitted from the position input apparatus 24 and provides the screen position information to the display control unit 100. The display control unit 100 has a function of controlling screen display of the display 25 and is provided with a content screen display unit 116 and a scroll instruction reception unit 110. The content screen display unit 116 has a template screen display unit 102, a content image display unit 104, a related information display unit 106, and an operator display unit 108, and the scroll instruction reception unit 110 has a first reception unit 112 and a second reception unit 114.

The functions of the control unit 50 are implemented by CPU, memory, a content management application program loaded into the memory, or the like. FIG. 8 depicts functional blocks implemented by the cooperation of these components. Thus, a person skilled in the art should appreciate that there are many ways of accomplishing these functional blocks in various forms in accordance with the components of hardware only, software only, or the combination of both. The control unit 50 has a multi-task processing function and is capable of performing a plurality of tasks at the same time.

The acquisition unit 120 acquires a content image 130 and content information 132 transmitted from the content delivery server 4 and stores the content image 130 and the content information 132 in the memory unit 60. The acquisition unit 120 acquires the content image 130 and the content information 132 stored in the memory unit 60 and provides the content image 130 and the content information 132 to the display control unit 100. As described, the acquisition unit 120 has both a function of acquiring a content image 130 and content information 132 from the content delivery server 4 and a function of acquiring a content image 130 and content information 132 from the memory unit 60. The latter acquisition function is realized by reading data from the memory unit 60 by the acquisition unit 120.

A content image 130 and content information 132 transmitted from the content delivery server 4 may be treated as a group of data sets for each item of content. The acquisition unit 120 may extract and acquire the content image 130 and the content information 132 from content data downloaded in the memory unit 60 and provide the content image 130 and the content information 132 to the display control unit 100. If the content is a game, the content data is configured to include a game program for executing the game and a content image 130 and content information 132 for identifying the game.

Figure 9:
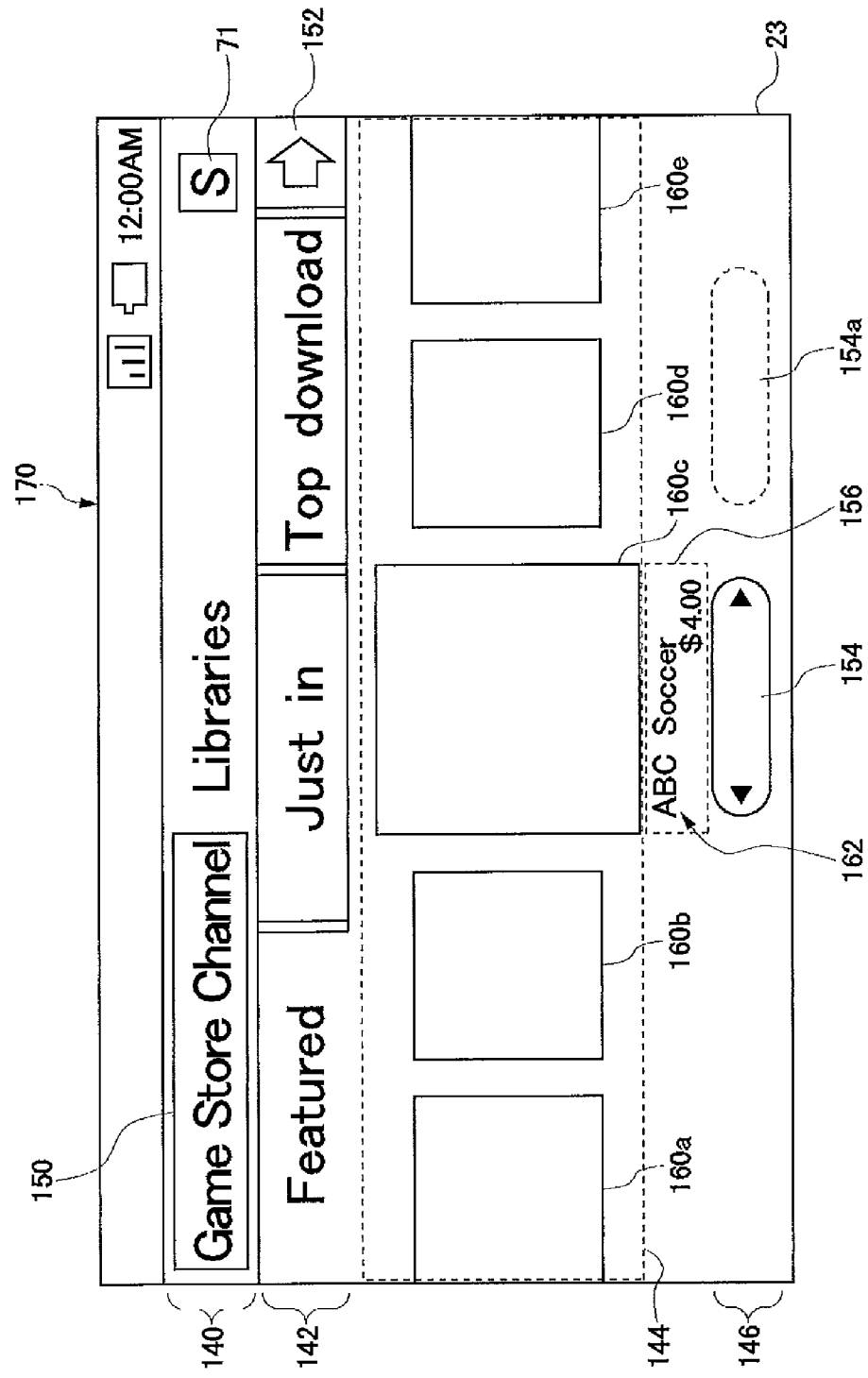
FIG. 9 is a diagram illustrating a display screen image shown at the time of starting a content management application.

FIG. 9 illustrates a display screen image 170 shown at the time of starting a content management application. In the display screen image 170, an access destination selection area 140, an index display area 142, a content image display area 144, and an operator display area 146 are formed.

In the access destination selection area 140, two access destinations, "Game Store Channel" and "Libraries", are displayed. In the present exemplary embodiment, the access destination is the content delivery server 4 if "Game Store Channel" is selected, and the access destination is the memory unit 60 if "Libraries" is selected. In the content image display area 144, a content image of an access destination selected in the access destination selection area 140 is displayed. A selection frame 150 is set to specify an access destination selected by the user. In the display screen image 170, the access destination, "Game Store Channel", is being selected. Other display modes may be employed in order to indicate that the access destination is the one that has been selected. For example, "Game Store Channel" may be shown in bold text or displayed in an eye-catching color. The user selects an access destination by tapping the display area of "Game Store Channel" or "Libraries".

In the index display area 142, an index tab for sorting content images to be displayed is formed. In the index display area 142, "Featured" is an index for a group of games recommended by a content distributor, "Just in" is an index for a group of new games, and "Top download" is an index for a group of popular games. These are intended to be illustrative only, and other types of index tabs may be formed. By tapping an index tab, the user selects the type (group) of content images to be displayed.

In the content image display area 144, content images 160a, 160b, 160c, 160d, and 160e and content information 162 that belong to a type selected through an index tab. In the content image display area 144, the plurality of content images 160a, 160b, 160c, 160d, and 160e (hereinafter, generically referred to as "content images 160") are arranged horizontally side by side, and the content image 160c arranged at the center position is displayed such that the content image 160c is larger than other content images 160a, 160b, 160d, and 160e. An information display area 156 for displaying the content information 162 is formed below the content image 160c. The content information 162 is information related to the content image 160c. In this example, a game title and a price are displayed as the content information 162. Information display areas 156 may be also formed below the other content images 160a, 160b, 160d, and 160e, and respective sets of content information 162 may be displayed.

When the user places his/her finger on the content image display area 144 and moves (traces) his/her finger to the right or left, the content images 160 move to the right or left in accordance with the movement of the finger. The content image display area 144 includes a plurality of areas for arranging the content images 160 and may be formed as a rectangular area as shown in the figure. When the content images 160 move, the content information 162 displayed in the information display area 156 also changes in accordance with a content image 160c displayed at the center position. A process of scrolling based on input information in the content image display area 144 is referred to as a "first scrolling process".

In the operator display area 146, an operator 154 for moving the content images 160 in a transverse direction is formed. The operator 154 is a bar used to scroll the content images 160. By moving the bar to the right or left by a finger from the center position shown in the figure, the content images 160 move at speed according to the amount of motion. In this example, as the amount of shift of the operator 154 from the center position becomes larger, the speed of movement of the content images 160 becomes faster. An operator 154a shows a condition where the operator 154 is moved to the right from the center position. The content images 160 move to the left at speed according to the amount of displacement from the center position at this time. A process of scrolling based on input information for the operator 154 is referred to as a "second scrolling process". The second scrolling process may be configured using a scroll bar formed to include a knob such that the amount of motion of the operator 154 corresponds to the amount of movement of the content images 160.

As described, two types of scrolling processes are prepared in the electronic device 10. The first scrolling process is used when scrolling the content images 160 at low speed, and the second scrolling process is used when scrolling the content images 160 at high speed.

When the user taps the content image 160c arranged at the center position while "Game Store Channel" is being selected as an access destination, for example, a purchase screen image shown in FIG. 7 is displayed on the touch panel 23. As described, the content management application has a role of supporting the download of content data. When the user taps a link area 152, a menu screen image of the content delivery server 4 shown in FIG. 4 is displayed on the touch panel 23.

Referring back to FIG. 8, when the content management application is started, the acquisition unit 120 acquires a content image 130 and content information 132 from the content delivery server 4 via the communication unit 40 and stores the content image 130 and the content information 132 in the memory unit 60. At this time, preferably, the acquisition unit 120 acquires content lists included in the indexes, i.e., "Featured", "Just in", and "Top download", respectively, formed in the index display area 142 and acquires both content images 130 and content information 132 included in all the indexes all at once. The content images 130 and the content information 132 are stored in a predetermined area in the memory unit 60. The content lists of the respective indexes include link information for the content images 130 and the content information 132 that are stored in the memory unit 60. By storing the content images 130 and the content information 132 included in all the indexes in advance in the memory unit 60, the content images 160 and the content information 162 can be promptly arranged in the content image display area 144 using the content lists without accessing the content delivery server 4 again even when index tabs are switched.

In the display control unit 100, the template screen display unit 102 displays a template screen image. The template screen image is a screen image obtained by excluding the content images 160, the content information 162, and the operator 154 from the display screen image 170. The acquisition unit 120 reads from the memory unit 60 content images 160 and content information 162 that correspond to an index selected in the index display area 142 and provides the content images 160 and the content information 162 to the content image display unit 104 and the related information display unit 106, respectively. The acquisition unit 120 reads, in reference to a content list of the index, the content images 160 and the content information 162 from the memory unit 60 using link information included in the list at this time.

The content image display unit 104 arranges the plurality of content images 160 side by side in the content image display area 144. In the display screen image 170, the plurality of content images 160 are lined up in a transverse direction on the touch panel 23. Alternatively, the content images 160 may be lined up in a longitudinal direction or in an oblique direction. The content image display unit 104 orders respective game titles in alphabetical order and lines up the game titles from left to right in that order. If the game titles are in Japanese, the content image display unit 104 orders the game titles in the order of the Japanese syllabary and lines up the game titles from left to right in that order. As shown in the content image display area 144, a content image 160c in the center is displayed such that the content image 160c is larger than other content images. In a content list acquired from the content delivery server 4, the order in which game titles are displayed may be pre-designated to be the alphabetical order or order of the Japanese syllabary, and the content image display unit 104 may arrange a plurality of content images 160 in the content image display area 144 in accordance with the order in which the game titles are displayed.

The related information display unit 106 displays content information 162 in the information display area 156 in conjunction with the content image 160c displayed by the content image display unit 104. A game title and a price are shown in this case. Alternatively, the name of a game maker, stars indicating an evaluation result, and the like may be displayed.

The operator display unit 108 displays the operator 154 at the center position of the operator display area 146. As described, when the operator 154 is moved by the user, the second scrolling process will be performed. The scroll instruction reception unit 110 receives a moving instruction, i.e., a scroll instruction, for the content images 160 arranged side by side.

When "Libraries" is selected in the access destination selection area 140, the access destination is changed, and content images 160 for the content stored in the memory unit 60 are displayed.

Figure 10:
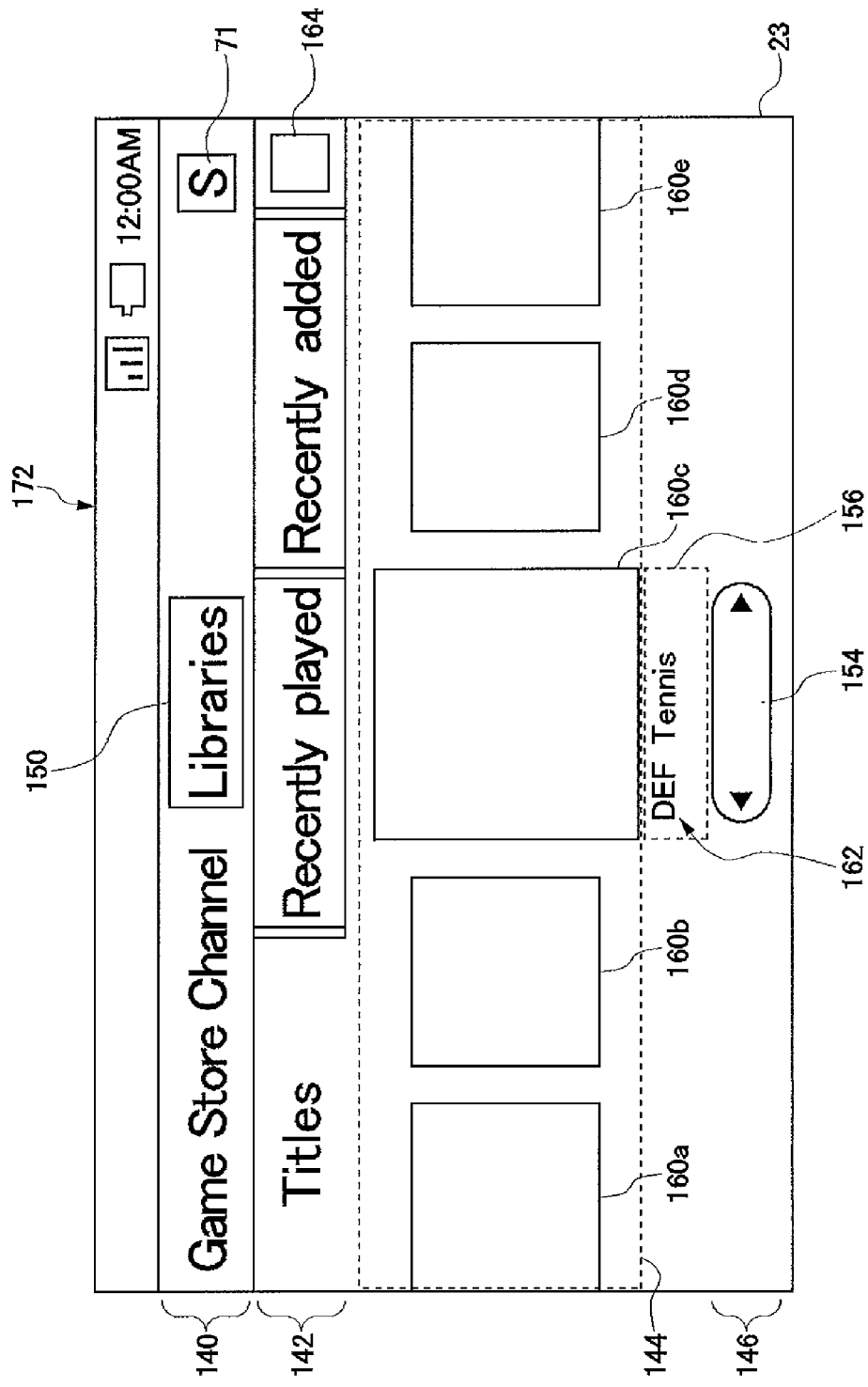
FIG. 10 is a diagram illustrating a display screen image shown when an access destination is changed.

FIG. 10 illustrates a display screen image 172 shown when the access destination is changed. The display screen image 172 is basically the same as the display screen image 170 shown in FIG. 9. Thus, an explanation is given regarding differences therebetween.

The selection frame 150 moves to the display area of "Libraries". This allows the user to confirm that the access destination is the memory unit 60, and content images 130 and content information 132 for games that have already been downloaded and stored in the memory unit 60 are to be displayed in the content image display area 144. As shown in FIG. 4, the content delivery server 4 manages, as "My downloads" for each user, the content downloaded by the electronic device 10. In other words, the content delivery server 4 keeps track of the content stored in the memory unit 60. In addition to acquiring the content images 130 and the content information 132 that are stored in the content delivery server 4, the acquisition unit 120 may acquire the content images 130 and the content information 132 for the content stored in the memory unit 60 at the same time when generating the display screen image 170 shown in FIG. 9.

In the index display area 142, an index tab for sorting content images 160 to be displayed is formed. In the index display area 142, "Titles" is an index for a game group downloaded in the memory unit 60, "Recently played" is an index for a recently played game group, and "Recently added" is an index for a recently downloaded game group. These are intended to be illustrative only, and other types of indexes may be formed. By tapping an index tab, the user selects the type of content images 160 to be displayed.

The display control unit 100 creates in advance a table for content stored in the memory unit 60.

FIG. 11 illustrates the created content table. In the content table, a game title, link information for identifying an area in which a content image 130 or the like is stored, the date and time of the downloading of content data, the date and time of the last play, and the initial letter of the title are associated with one another. The display control unit 100 records information regarding content in the content table at the time of downloading the content data. The initial letter of the title is the initial letter of the game title. The display control unit 100 extracts the initial letter from the game title and includes the initial letter in the table. Every time the game is played, the display control unit 100 updates the date and time of the last play. The content table is stored in the memory unit 60.

Based on an index selected by the user, the acquisition unit 120 reads, from the memory unit 60, and acquires content images 130 and content information 132 that correspond to the index, in reference to the content table.

For example, when the "Titles" index is selected, the acquisition unit 120 acquires content images 130 and content information 132 from the memory unit 60 using link information of all game titles included in the content table. For example, when the "Recently played" index is selected, the acquisition unit 120 identifies game titles last played within a predetermined number of days from the current date and time and acquires content images 130 and content information 132 from the memory unit 60 using link information of the identified game titles, in reference to the dates and times of the last play included in the content table. The content image display unit 104 arranges a plurality of content images 160 side by side in the content image display area 144. The related information display unit 106 displays corresponding content information 162 in the information display area 156 in conjunction with a content image 160c displayed by the content image display unit 104.

The display control unit 100 may create a content list included in each index in advance in accordance with the content table shown in FIG. 11. The display control unit 100 updates the content list every time there is an update for the information of the content table. For example, a content list of "Titles" includes all game titles downloaded onto the memory unit 60. In reference to the respective initial letters of the game titles, the display control unit 100 sorts the game titles into classes corresponding to alphabets. The classes specify a display order at the time of the second scrolling process, which is described later. More specifically, the display control unit 100 sorts the game titles into classes, "A", "B", . . . , and "Z". If the initial letter of a game title is A, the game title is sorted into the class "A". If the initial letter of a game title is Z, the game title is sorted into the class "Z". The display control unit 100 sets a display order according to classes. In this example, the display control unit 100 sets to display content images in alphabetical order and creates a content list. A display order in each class is set in alphabetical order of the second and subsequent letters of each game title. This allows a class and a display order to be set for each game title in the content list. The content list includes display information corresponding to a class and, more specifically, includes alphabets such as A, B, . . . , and Z. This content list is updated every time a new game title is downloaded.

A content list "Recently played" includes game titles last played within a predetermined number of days (e.g., 7 days) from the current date. For example, by setting the present day as a current day, the display control unit 100 sorts game titles included in the content table into classes, "current day", "one day before", "two days before", "three days before", and "one week before" based on the date and time of the last play of each game title. More specifically, a game title is sorted into "current day" if the present day and the date of the last play thereof is the same and is sorted into "one day before" if the date of the last play thereof is one day before the present day. Similarly, a game title is sorted into "one week before" if the date of the last play thereof is four to seven days before the present day. A game title is not included in the content list for "Recently played" if the date of the last play thereof is eight or more days before. The display control unit 100 sets a display order according to classes. In this example, the display control unit 100 sets to display game titles in order of date and time closer to the present date and time, i.e., in order of "current day", "one day before", "two days before", "three days before", and "one week before", and creates a content list. A display order in each class is set based on time information regarding the date and time of the last play. As described, the display control unit 100 creates a content list for "Recently played" in which a game title, a class, and a display order are associated. The content list also includes display information corresponding to a class and, more specifically, includes display information such as "current day", "one day before", "two days before", "three days before", "one week before", and the like. This content list is updated every time a game is played. The display control unit 100 creates a content list for "Recently added" in a similar manner. The content list is stored in the memory unit 60.

When the display control unit 100 creates a content list for each index in advance as described above, the acquisition unit 120 can acquire content images 130 and content information 132 from the memory unit 60 in reference to the content list. With this, compared to the acquisition of the content images 130 and the content information 132 from the content table, the acquisition unit 120 can reduce the time for acquisition.

Referring to FIG. 10, a thumbnail image 164 is a content image of a game being paused. The electronic device 10 has a mechanism of pausing the progress of the game and displaying a display screen image 172 when the user presses a PAUSE button while playing the game. Since the electronic device 10 is capable of performing a multi-task process, the user can select another game in the display screen image 172 and play the game while pausing the progress of a game the user has been playing. By tapping the thumbnail image 164, the user can go back to the game being paused. The thumbnail image 164 may be, for example, a content image of a last played game. In this case, by tapping the thumbnail image 164, the user can execute a game that was previously played.

An explanation is given regarding two types of scrolling processes in the following.

Based on a touch by a finger or the like, the position input apparatus 24 transmits to the control unit 50 position information regarding a touched part on the touch panel 23. The input detection unit 90 detects position information transmitted from the position input apparatus 24 and provides the position information to the scroll instruction reception unit 110.

(First Scrolling Process)

When the position information indicates a touched position in the content image display area 144, the first reception unit 112 receives the position information as a moving instruction for content images. More specifically, the first reception unit 112 derives the direction of movement, the amount of movement (distance), and the speed of movement of content images 160 based on the position information and acquires the derived direction of movement, the derived amount of movement, and the derived speed of movement as a moving instruction. In the present exemplary embodiment, the first reception unit 112 detects the motion of a finger within a range of a predetermined angle from the horizontal direction of the screen as a movement in the rightward direction or the leftward direction of the screen. The first reception unit 112 derives the amount of movement and the speed of movement of the content images 160 based on a distance from a point (touch start point) at which a finger comes into contact with a touch panel 23 to a point (touch end point) at which the finger is removed and on speed at that time. As described, the first reception unit 112 acquires a moving instruction based on input to the display area of the content images 160 displayed on the display 25. The first reception unit 112 transmits the moving instruction to the content image display unit 104 and the related information display unit 106. The content image display unit 104 moves the content images 160 in a predetermined order on the display 25 based on the moving instruction. Referring to FIG. 10, five content images 160 are set to be displayed in the content image display area 144, and the content image display unit 104 moves the content images 160 by the indicated amount of movement in an indicated direction and in indicated speed.

The related information display unit 106 controls content information 162 displayed in the information display area 156 based on the moving instruction such that the content information 162 matches a content image 160c displayed at the center position of the content image display area 144 at this time. In other words, when the content images displayed in the content image display area 144 are scrolled, the related information display unit 106 sequentially displays, in the information display area 156, a game title that matches a content image 160c displayed at the center position.

Figure 12:
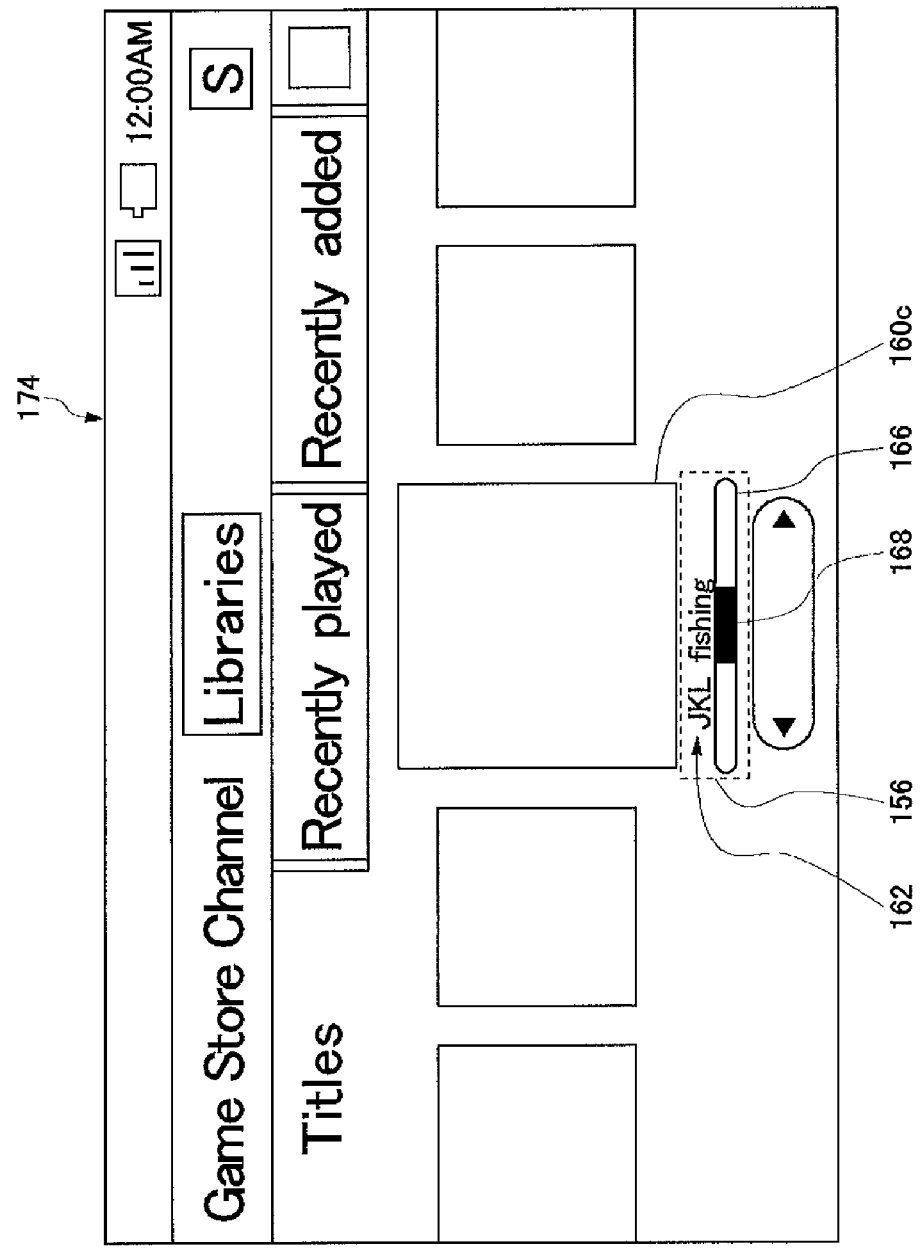
FIG. 12 is a diagram illustrating a display screen image shown at the time of a first scrolling process.

FIG. 12 illustrates a display screen image 174 shown at the time of a first scrolling process. In addition to displaying a game title of a content image 160c displayed in the center position, the information display area 156 displays an indicator 166. The indicator 166 is used to indicate a relative position of content images 160 being displayed among a plurality of content images 160 for which a display order is set. The entire length of the indicator 166 represents the total number of content images 160, and the length of a display indicator 168 included in the indicator 166 represents a ratio of the number of content images 160 being displayed (five in this case) to the total number of content images 160. The position of the display indicator 168 indicates a relative position in the display order. Content information 162 displayed in the information display area 156 at the time of a first scrolling process is a game title and is the same as content information 162 (see FIG. 10) displayed in the information display area 156 when no scrolling is performed (during rest).

(Second Scrolling Process)

When the position information indicates a touched position on the operator 154, the second reception unit 114 receives the position information as a moving instruction for content images. More specifically, the second reception unit 114 obtains the amount of displacement from a reference position (center position in the operator display area 146) of the operator 154 based on the position information, derives the direction of movement and the speed of movement of the content images 160, and acquires the derived direction of movement and the derived speed of movement as a moving instruction. As described, the second reception unit 114 acquires a moving instruction based on input to the operator 154 displayed in an operable manner on the display 25. The second reception unit 114 transmits the moving instruction to the content image display unit 104 and the related information display unit 106. The content image display unit 104 moves the content images 160 in a predetermined order on the display 25 in an indicated direction and in indicated speed based on the moving instruction.

Figure 13:
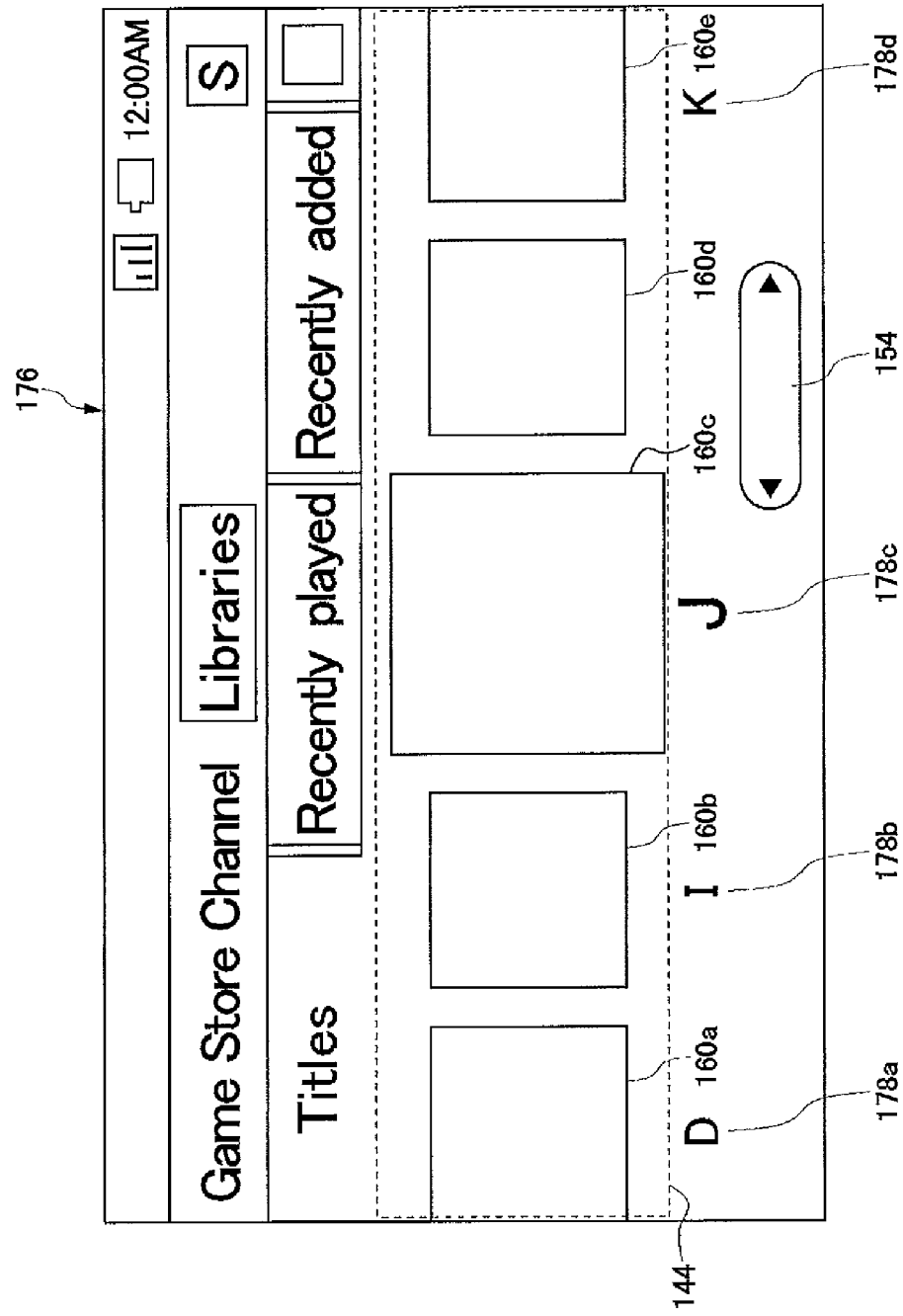
FIG. 13 is a diagram illustrating a display screen image shown at the time of a second scrolling process.

FIG. 13 illustrates a display screen image 176 shown at the time of a second scrolling process and illustrates a state where the operator 154 is moved in the rightward direction. When the user drags the operator 154 from the reference position in the rightward direction, a moving instruction for movement in the leftward direction is generated. When the user removes his/her finger from the touch panel 23, the operator 154 automatically returns to the reference position. The second reception unit 114 continues to acquire a moving instruction until the operator 154 returns to the reference position. In the present exemplary embodiment, a mechanism is employed where the content images 160 move to the left when the operator 154 is moved to the right. Alternatively, a design may be employed such that the content images 160 move to the right when the operator 154 is moved to the right.

As the amount of displacement of the operator 154 becomes larger, the second reception unit 114 receives a moving instruction for faster speed of movement. Therefore, this second scrolling process is suitable for high-speed scrolling. It is considered that this second scrolling process is actively used by the user, for example, when the number of items of content to be displayed is large. When high-speed scrolling is performed, it is difficult for the user to visually check content information 162 even when the related information display unit 106 displays the content information 162. As information related to the content images 160 arranged in the display screen image 176, the related information display unit 106 displays, instead of displaying the content information 162, information related to the display order of the content images 160 in association with the content images 160. In this example, the content images 160 are ordered in alphabetical order. Thus, the respective alphabets of the initial letters of the game titles are used as indicators 178a, 178b, 178c, and 178d related to the display order. The initial letters of the game titles are mapped to the respective game title and the respective content images 160 by the related information display unit 106 and acquired from the content table shown in FIG. 11 or from a content list generated from the content table.

Figure 14A:
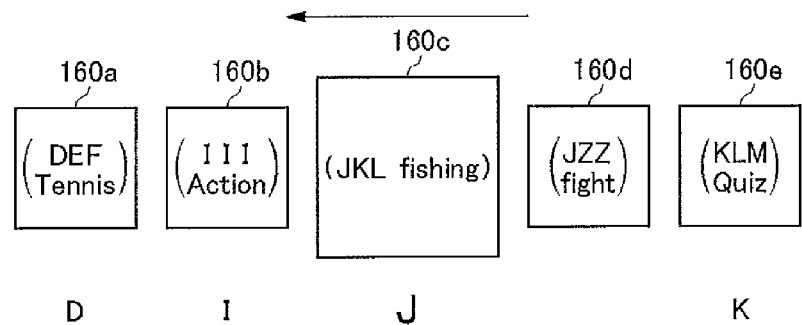
FIGS. 14A through 14C are diagrams illustrating an example of adding information related to a display order of content images.
Figure 14B:
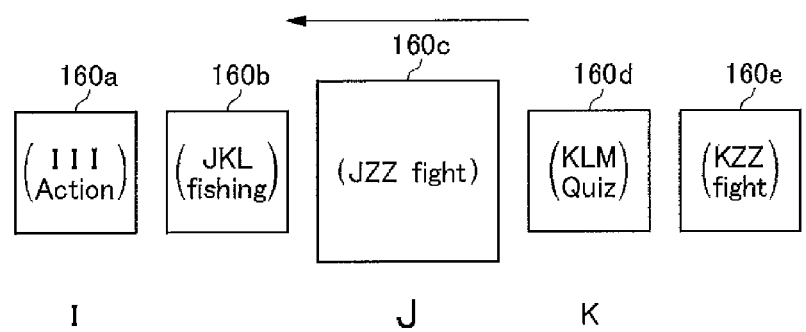
Figure 14C:
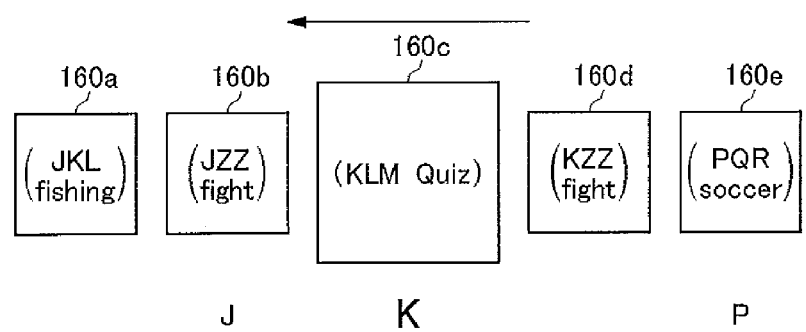

In this example, the content images 160 are moved to the left by moving the operator 154 to the right. The initial letter of the content image 160c is "J" and is shown as the indicator 178c. If the initial letter of the content image 160d is also "J", an indicator 178 is not added to the content image 160d. This is because the user can recognize that the game title thereof has the same initial letter of that of the previous content image 160c if an indicator is not added to the subsequent content image 160d. On the other hand, the indicator 178d, which is represented by "K", is added to the content image 160e. The user can recognize that a game title starting with "K" has appeared at the right edge after a game title starting with "J". By displaying the initial letter of the game title of the content image 160e before the content image 160e moves to the center position, the user can learn when to remove his/her finger from the operator 154 so as to stop scrolling. As described, a plurality of content images 160 are displayed in the content image display area 144. Thus, indicators 178a, 178b, and 178d are preferably added to content images 160 other than the content image 160c located at the center position in order to show switching of initial letters so as to assist a user's task of finding a target game title FIGS. 14A through 14C illustrate examples of adding information related to a display order of content images. In FIGS. 14A through 14C, a game title is described in each frame expressing a content image 160 in order to facilitate understanding. FIG. 14B illustrates a state where content images have been shifted to the left by one content image from a state shown in the display screen image in FIG. 14A. FIG. 14C illustrates a state where content images have been shifted to the left by one content image from a state shown in the display screen image in FIG. 14B.

Figure 15:
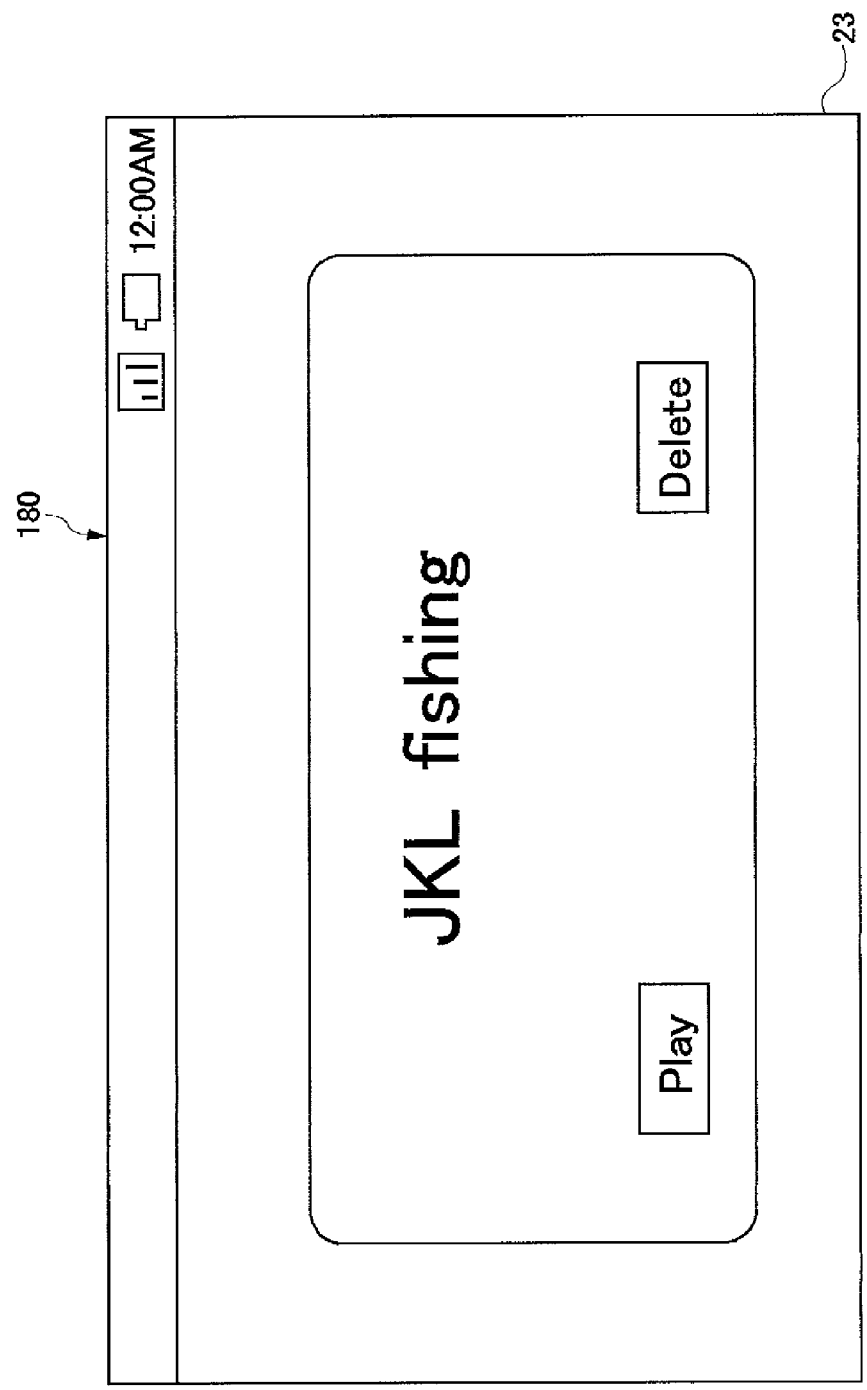
FIG. 15 is a diagram illustrating a play selection screen image.

In FIG. 14A, the related information display unit 106 displays "J" below a content image 160c located at the center position. The related information display unit 106 displays an indicator 178 below a content image 160c at all times. In a display screen image in which "Libraries" is set to be the access destination, by tapping a content image 160c located at the center position, the user can execute a game thereof. Therefore, an indicator 178 is set to be displayed below a content image 160c at all times. FIG. 15 illustrates a play selection screen image 180. When the user touches a Play button, game software, "JKL fishing", is started.

Referring back to FIG. 14A, the indicator 178 is displayed below the content image 160c at all times. Thus, even when a game title having the same initial letter exists next to the content image 160c, an indicator 178 is not displayed below a content image thereof (content image 160d in this case). In other words, the same indicator 178 is not displayed. "D", "I", and "K" are displayed below a content image 160a, a content image 160b, and a content image 160e, respectively. By seeing "K", the user can recognize that a game title whose initial letter is K is approaching while being scrolled. For example, when playing a game title whose initial letter is K, the user can learn that it is time to remove his/her finger from the operator 154.

In FIG. 14B, the related information display unit 106 displays "J" below a content image 160c located at the center position. "J" is also the initial letter of "JKL fishing" that has been moved to the left from the center position. However, since the initial latter of a game title "JZZ fight" located at the center position is "J", the related information display unit 106 displays "J" below the content image 160c instead of displaying "J" below a content image 160b. As described, while displaying the initial letter of the game title below the content image 160c located at the center position, the related information display unit 106 does not display the initial letter of the game title with the same initial letter below the content image 160b. The related information display unit 106 displays "K" below the content image 160d. However, since the initial letter of a game title of the content image 160e is also "K", the related information display unit 106 does not display an indicator 178 below the content image 160e. As described, when displaying, before the center position (i.e., at the right side) in the direction of scrolling, an initial letter different from the initial letter of the game title located at the center position, the related information display unit 106 displays the initial letter "K" of a game title below the content image 160d located closer to the center position. The related information display unit 106 displays "I" below the content image 160a.

In FIG. 14C, the related information display unit 106 displays "K" below a content image 160c located at the center position. The related information display unit 106 also displays "P" below a newly-displayed content image 160e. By seeing "P", the user can recognize that a game title whose initial letter is P is approaching while being scrolled. An initial letter "J" that has passed the center position is displayed below a content image 160b, which is the last content image with the initial letter. As described, when displaying, after the center position (i.e., at the left side) in the direction of scrolling, an initial letter different from the initial letter of the game title located at the center position, the related information display unit 106 displays the initial letter "J" of a game title below the content image 160b located closer to the center position.

As described above, in the electronic device 10 according to the present exemplary embodiment, two types of scrolling processes are prepared, and the related information display unit 106 displays different related information for the same content images 160 arranged by the content image display unit 104 in each case, as shown in FIGS. 12 and 13. More specifically, the related information display unit 106 displays different types of related information when the first reception unit 112 acquires a moving instruction and when the second reception unit 114 acquires a moving instruction. By displaying different types of related information, a user interface that takes advantage of features of each scrolling process can be realized. As described above, a content list includes display information that corresponds to a class. During a second scrolling process, the acquisition unit 120 may read out the display information that corresponds to a class from the content list and provide the display information to the related information display unit 106, and the related information display unit 106 may display, as related information, the display information that corresponds to a class.

Figure 16:
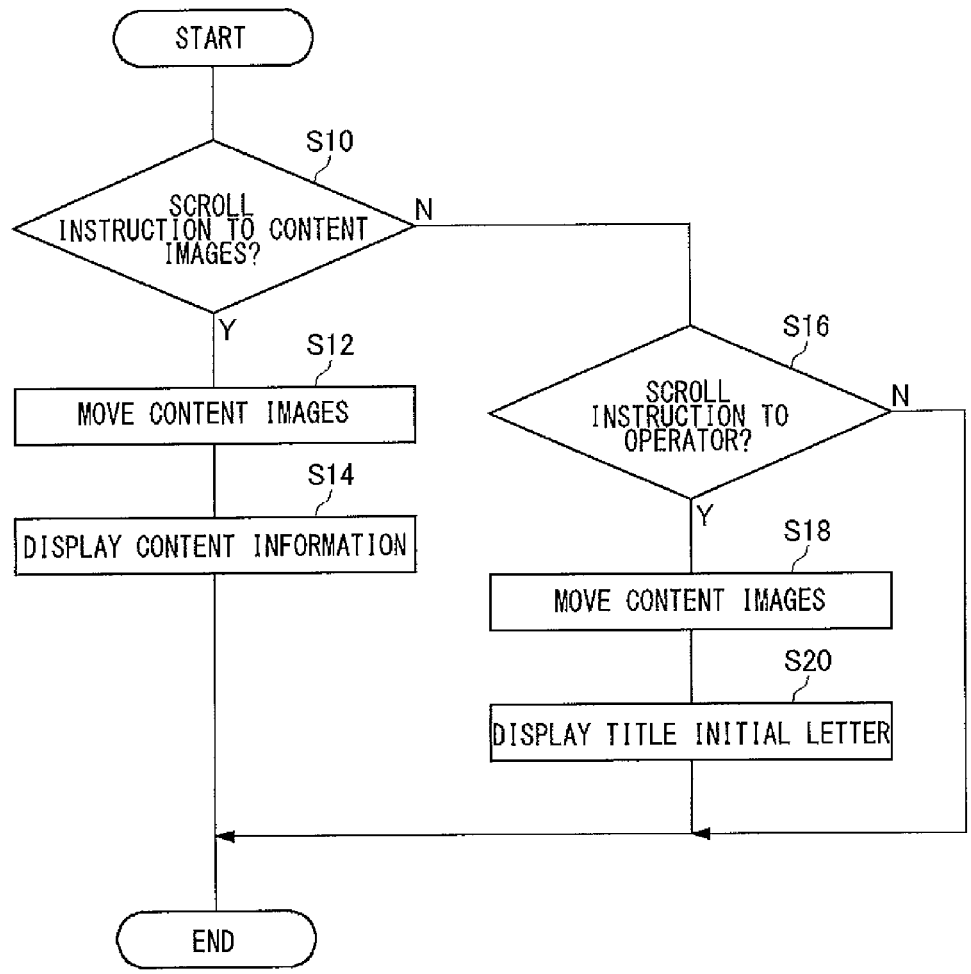
FIG. 16 is a diagram illustrating a flowchart of a scrolling process.

FIG. 16 illustrates a flowchart of a scrolling process. A flowchart shown in FIG. 16 displays the processing procedure of components by a combination of a letter "S" (the initial of the word "Step"), which represents a step, and a number. When some sort of a determination process is performed by a process displayed by the combination of a letter "S" and a number, the processing sequence is displayed while adding a letter "Y" (the initial of the word "Yes") when the determination result is positive (e.g., Y in S10) and is displayed while adding a letter "N" (the initial of the word "No") when the determination result is negative (e.g., N in S10). The meaning of the display in the flowchart is the same as that in a flowchart shown in another figure.

When the first reception unit 112 acquires a scroll instruction to a content image, i.e., a scroll instruction input to the content image display area 144 from the input detection unit 90 (Y in S10), the content image display unit 104 moves (scrolls) content images 160 in accordance with the scroll instruction (S12), and the related information display unit 106 displays content information for identifying content for a content image 160c located at the center position in association with the content image 160c (S14).

On the other hand, in a case where the first reception unit 112 does not acquire a scroll instruction (N in S10), when the second reception unit 114 acquires a scroll instruction to the operator 154 from the input detection unit 90 (Y in S16), the content image display unit 104 moves content images 160 in accordance with the scroll instruction (S18), and the related information display unit 106 displays the respective initial letters of the titles of the content images 160 displayed in the content image display area 144 (S20). If the second reception unit 114 does not acquire a scroll instruction (N in S16), this flow is ended.

An example has been shown where the content image display unit 104 orders a plurality of content images in alphabetical order of the respective game titles. For example, in the display screen image 172 shown in FIG. 10, content images included in an index group, "Recently played" or "Recently added", may be ordered according to date and time. The content image display unit 104 acquires a display order of the content images in accordance with a content table shown in FIG. 11 or in accordance with a content list generated based on the content table at this time. As described previously, a last-played date or a purchase date is classified into a separate class according to several stages in chronological order such as "current day", "one day before", "two days before", "three days before", and "one week before".

The related information display unit 106 displays the date and time of the last play or the date and time of purchase as related information during rest and during a first scrolling process. On the other hand, the related information display unit 106 displays "current day", "one day before", and "two days before" as indicators 178 related to a display order in accordance with a content table or a content list in a second scrolling process. Adding indicators 178 to the content image display area 144 as described above allows the user to recognize related information even during high-speed scrolling.

When the user removes his/her finger from the operator 154 such that the second reception unit 114 finishes receiving a moving instruction, the related information display unit 106 displays content information 162 in the information display area 156 as shown in FIG. 10. As shown in FIG. 12, the content information 162 is also displayed during the first scrolling process. Therefore, when the second scrolling process is completed, the related information display unit 106 displays, in the information display area 156, the content information 162 displayed during the first scrolling process.

<Content Search Process>

Figure 17:
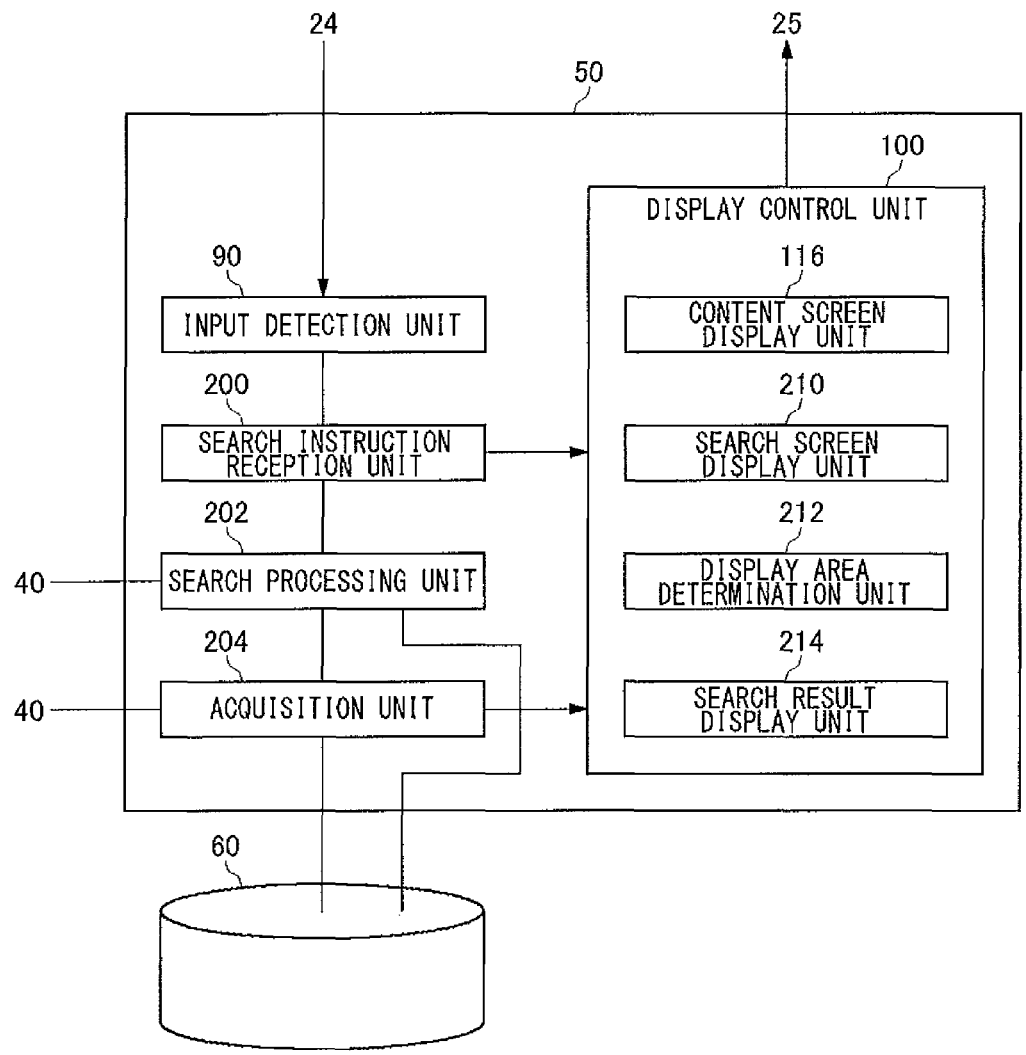
FIG. 17 is a diagram illustrating functional blocks of a control unit that performs a content search process.

FIG. 17 illustrates functional blocks of the control unit 50 that performs a process of searching content. The control unit 50 is provided with an input detection unit 90, a search instruction reception unit 200, a search processing unit 202, an acquisition unit 204, and a display control unit 100. The input detection unit 90 detects screen position information transmitted from the position input apparatus 24. The display control unit 100 has a function of controlling screen display of the display 25 and has a content screen display unit 116, a search screen display unit 210, a display area determination unit 212, and a search result display unit 214. The content screen display unit 116 is the same as the content screen display unit shown in FIG. 8 and generates a display screen image 172 for displaying content stored in the memory unit 60 (see FIG. 10) or a display screen image 170 for displaying content stored in the content delivery server 4 (see FIG. 9).

The functions of the control unit 50 are implemented by CPU, memory, a content management application program loaded into the memory, or the like. FIG. 17 depicts functional blocks implemented by the cooperation of these components. Thus, a person skilled in the art should appreciate that there are many ways of accomplishing these functional blocks in various forms in accordance with the components of hardware only, software only, or the combination of both.

In the display screen image 170 shown in FIG. 9 or the display screen image 172 shown in FIG. 10, a search processing function is activated when the user taps a search button 71. The input detection unit 90 detects position information transmitted from the position input apparatus 24 and provides the position information to the search instruction reception unit 200. When the search instruction reception unit 200 detects that the provided position information indicates the display area of a search button 71, the search instruction reception unit 200 recognizes that the position information is a search instruction, receives the position information, and then transmits the position information to the display control unit 100. In the display control unit 100, the search screen display unit 210 receives the search instruction and displays a search screen image.

Figure 18:
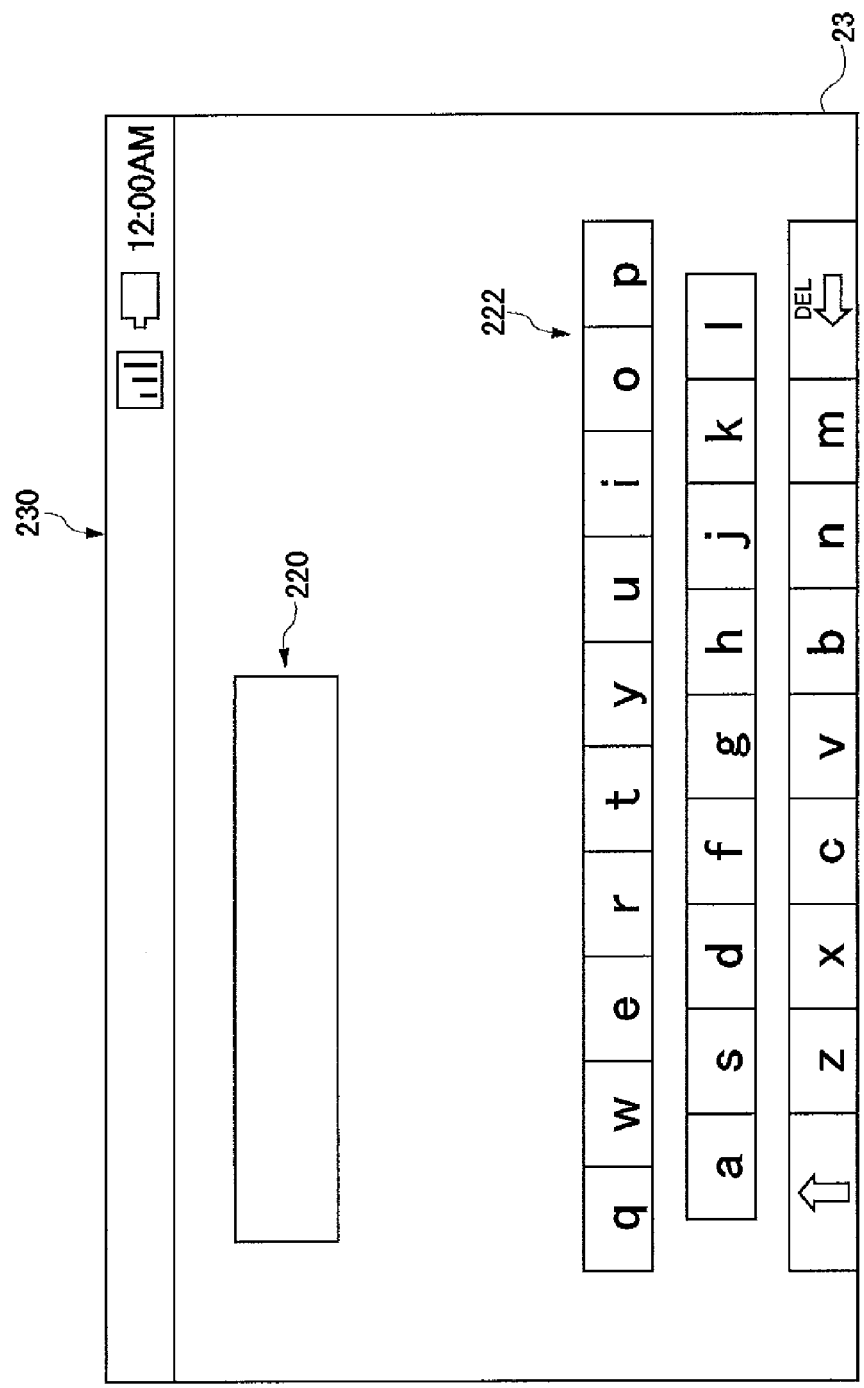
FIG. 18 is a diagram illustrating a search screen image.

FIG. 18 illustrates a search screen image 230. A software keyboard 222 is displayed in the search screen image 230. The user inputs a desired character string to an input window 220 by pressing the software keyboard 222. The input detection unit 90 transmits the input character string to the search instruction reception unit 200. The search instruction reception unit 200 receives the input character string as a search query. The search instruction reception unit 200 transmits the search query to the search processing unit 202.

In accordance with the search instruction and the search query received by the search instruction reception unit 200, the search processing unit 202 searches the memory unit 60 and also allows the content delivery server 4 to perform a search via the communication unit 40. For example, if the character string that has been input is "action", the search processing unit 202 searches content data stored in the memory unit 60 for content data that includes "action" in a character string. In content data, the category of a game is incorporated as attribute information. The search processing unit 202 searches for content data that includes "action" in attribute information thereof or in a game title thereof. The search processing unit 202 instructs the content delivery server 4 to perform the same search via the communication unit 40.

The acquisition unit 204 acquires search results from the content delivery server 4. The acquisition unit 204 also acquires search results of the memory unit 60 from the search processing unit 202. The acquisition unit 204 provides the acquired search results to the display control unit 100. The display control unit 100 displays search results of the memory unit 60 and search results of the content delivery server 4 in different display areas. In other words, the display control unit 100 divides the display 25 into two display areas and displays the search results of the memory unit 60 and the search results of the content delivery server 4 each in a separate display area. By displaying the search results separately, the user can tell between the respective sets of search results at a glance.

The display area determination unit 212 determines a display area for the search results of the memory unit 60 and a display area for the search results of the content delivery server 4. The display area determination unit 212 determines the display area for the search results of the memory unit 60 and the display area for the search results of the content delivery server 4 according to a screen image shown when the search instruction reception unit 200 received the search instruction. More specifically, the display area determination unit 212 determines a display area for a search result based on whether the search instruction reception unit 200 received the search instruction while a display screen image 170 in which the access destination was set to "Game Store Channel" was being displayed or the search instruction reception unit 200 received the search instruction while a display screen image 172 in which the access destination was set to "Libraries" was being displayed. Information identifying a display screen image shown when the search instruction was received is transmitted to the display area determination unit 212 by the search instruction reception unit 200.

Figure 19:
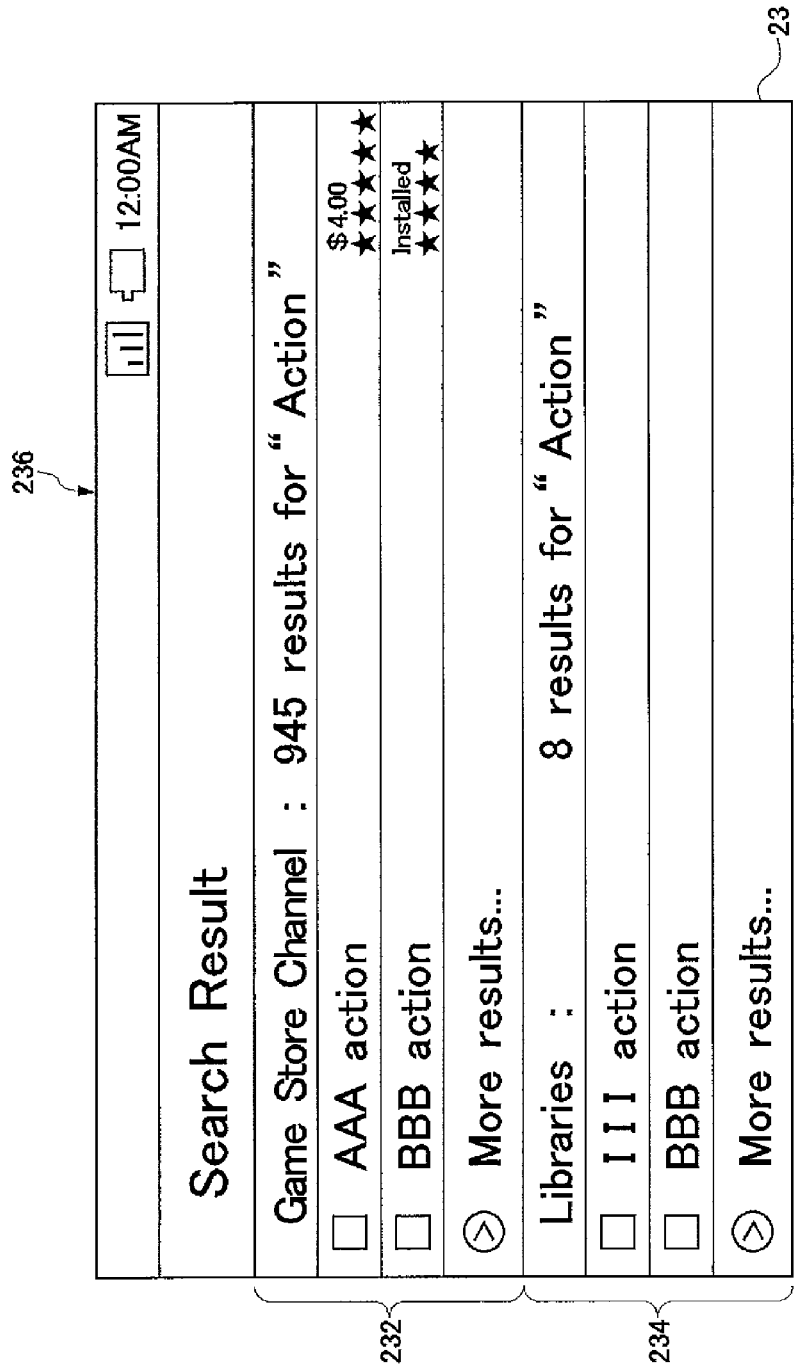
FIG. 19 is a diagram illustrating a search result screen image.

FIG. 19 illustrates a search result screen image 236. The search result screen image 236 is divided into a first display area 232 located at the upper part of the screen and a second display area 234 located at the lower part of the screen. In the search result screen image 236, the first display area 232 is located above the second display area 234. Thus, it is easier for the user to visually recognize a search result displayed in the first display area 232.

The display area determination unit 212 determines the display area for the search results of the memory unit 60 and the display area for the search results of the content delivery server 4 according to a screen image shown when the search instruction reception unit 200 received the search instruction. More specifically, when the search instruction reception unit 200 receives the search instruction while the display screen image 172 (see FIG. 10) displaying content stored in the memory unit 60 is being displayed, the display area determination unit 212 determines the display area for the search results of the memory unit 60 to be the first display area 232 located on a side that allows for easier visual recognition and determines the display area for the search results of the content delivery server 4 to be the second display area 234. On the other hand, when the search instruction reception unit 200 receives the search instruction while the display screen image 170 (see FIG. 9) displaying content stored in the content delivery server 4 is being displayed, the display area determination unit 212 determines the display area for the search results of the content delivery server 4 to be the first display area 232 located on a side that allows for easier visual recognition and determines the display area for the search results of the memory unit 60 to be the second display area 234. For example, in a case where the display areas of the respective search results are set to be on the left side and on the right side of the screen, the display area on the left side is treated as the first display area 232, and the display area on the right side is treated as the second display area 234 since the display area on the left side corresponds to an area that allows for easier visual recognition. FIG. 19 illustrates the search result screen image 236 shown when the search instruction is received while the display screen image 170 is being displayed.

It can be said that the user is interested in the search results of the memory unit 60 when the user taps a search button 71 in the display screen image 172, while it can be said that the user is interested in the search results of the content delivery server 4 when the user taps a search button 71 in the display screen image 170. Thus, by displaying search results in which the user has higher interest in the first display area 232, a search result screen image 236 can be provided that can be easily viewed by the user. The first display area 232 may be set to be larger than the second display area 234. With this, the number of displayed search results in which the user has higher interest can be relatively increased.

The search result display unit 214 displays the search results of the memory unit 60 and the search results of the content delivery server 4 side by side in the respective determined display areas. The search result display unit 214 lines up the search results of the memory unit 60 in first order and the search results of the content delivery server 4 in second order different from the first order. More specifically, the search result display unit 214 lines up the search results of the memory unit 60, for example, from above in order of recently played, while the search result display unit 214 lines up the search results of the content delivery server 4, for example, in order hits by search in the content delivery server 4. The search results of the content delivery server 4 may be lined up in alphabetical order.

In the first display area 232 shown in FIG. 19, a mark "installed" is added to a game title "BBB action". This means that the game is already downloaded. The content delivery server 4 manages already-downloaded content of the electronic device 10. Thus, when returning search results, the content delivery server 4 may add a predetermined mark such as "installed" to content that has already been downloaded. This process may be performed by the electronic device 10. When the search results of the content delivery server 4 include already-downloaded content, the display of the content can be deleted from the search result screen image 236.

Figure 20:
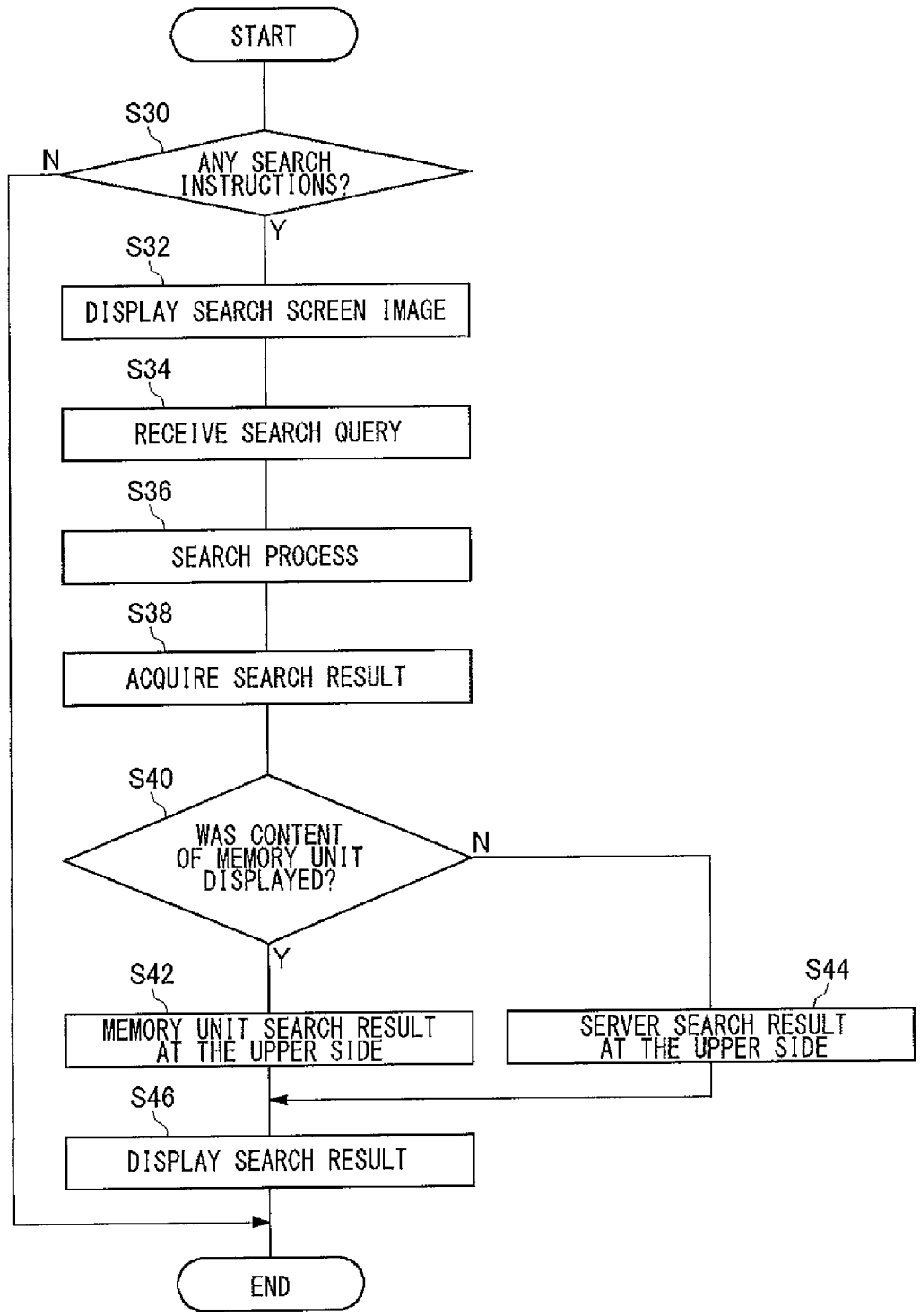
FIG. 20 is a diagram illustrating a flowchart of a search process.

FIG. 20 illustrates a flowchart of a search process. When the user taps a search button 71, the search instruction reception unit 200 receives a search instruction (Y in S30). If the user does not tap the search button 71 (N in S30), the search process is not started.

The search screen display unit 210 receives the search instruction and displays a search screen image (S32). Upon receiving a search query input to the search screen image (S34), the search instruction reception unit 200 transmits the search query to the search processing unit 202. In accordance with the search instruction and the search query, the search processing unit 202 searches the memory unit 60 and also allows the content delivery server 4 to perform a search via the communication unit 40 (S36). The acquisition unit 204 acquires search results from the content delivery server 4 and also acquires search results of the memory unit 60 from the search processing unit 202 (S38). The acquisition unit 204 provides the acquired search results to the display control unit 100.

The display area determination unit 212 determines the display area for the search results of the memory unit 60 and the display area for the search results of the content delivery server 4 according to a screen image shown when the search instruction reception unit 200 received the search instruction (S40). When content of the memory unit 60 is being displayed (Y in S40), the display area determination unit 212 determines the first display area 232 located at the upper side to be a display area for the search results of the memory unit 60 (S42), and the search result display unit 214 displays the search results (S46). On the other hand, when content of the content delivery server 4 is being displayed (N in S40), the display area determination unit 212 determines the first display area 232 located at the upper side to be a display area for the search results of the content delivery server 4 (S44), and the search result display unit 214 displays the search results (S46).

Described above is an explanation based on the exemplary embodiment of the present invention. The exemplary embodiment is intended to be illustrative only, and it will be obvious to those skilled in the art that various modifications to constituting elements and processes could be developed and that such modifications are also within the scope of the present invention.

In the exemplary embodiment, the user inputs an instruction through the touch panel 23. Alternatively, the user may input an instruction through an operation key provided on the electronic device 10. For example, if the electronic device 10 does not have a touch panel 23, a configuration may be employed in reference to FIG. 2 where a moving instruction during a first scrolling process is input through the operation of an L button 37 or an R button 38 and where a moving instruction during a second scrolling process is input through a directional key 31*b* or 31*d*. Even when there exists a touch panel 23, an entry of scroll instruction input may be assigned to an operational key.

In the exemplary embodiment, a situation is illustrated where content is a game. Even when, for example, the content is music, a movie, a book, or the like, the content to be displayed is classified into a separate class in advance according to titles, reproduction dates and times, and the like. Thus, the titles are displayed at the time of a first scrolling process, and sets of display information corresponding to respective classes are displayed in association with display items at the time of a second scrolling process.

What is claimed is:

1. An electronic device having a communication function comprising:

a memory unit configured to store content data;

a communication unit configured to connect to a server;

a reception unit configured to receive a content search instruction;

a search processing unit configured to search the memory unit and allow the server to perform a search via the communication unit, in accordance with the search instruction received by the reception unit; and a display control unit configured to display a search result of the memory unit and a search result of the server in different display areas, wherein the display control unit has:a content screen display unit configured to generate a first screen image for displaying content stored in the memory unit or a second screen image for displaying content stored in the server; and a display area determination unit configured to determine a display area for the search result of the memory unit and a display area for the search result of the server, wherein the reception unit receives the search instruction when the first screen image or the second screen image is being displayed, and wherein the display area determination unit determines the display area for the search result of the memory unit and the display area for the search result of the server according to a screen image shown when the reception unit received the search instruction.

2. The electronic device according to claim 1, wherein the display area determination unit sets the display area for the search result of the memory unit to be at a position that allows for easier visual recognition compared to that of the display area for the search result of the server when the reception unit receives the search instruction when the first screen image is being displayed and sets the display area for the search result of the server to be at a position that allows for easier visual recognition compared to that of the display area for the search result of the memory unit when the reception unit receives the search instruction when the second screen image is being displayed.

3. The electronic device according to claim 1, wherein the display area determination unit sets the display area for the search result of the memory unit to be larger than the display area for the search result of the server when the reception unit receives the search instruction when the first screen image is being displayed and sets the display area for the search result of the server to be larger than the display area for the search result of the memory unit when the reception unit receives the search instruction when the second screen image is being displayed.

4. The electronic device according to claim 1,
wherein the display control unit has a search result display unit configured to line up the search result of the memory unit and the search result of the server in the respective display areas, and
wherein the search result display unit lines up the search result of the memory unit in first order and the search result of the server in second order different from the first order.

5. A search processing method comprising:
connecting to a server;
receiving a content search instruction at a reception unit;
searching a memory unit for storing content data and allowing the connected server to perform a search, in accordance with the received search instruction;
generating a first screen image for displaying content in a memory unit or a second screen image for displaying content stored in the server;
determining a display area for a search result of the memory unit and a display area for the search result of the server according to a screen image shown when the reception unit received the search instruction; and
displaying a search result of the memory unit and a search result of the server in different display areas,
wherein the receiving step includes receiving the content search instruction when the first screen image or the second screen image is being displayed, and
wherein the determining step includes determining the display area for the search result of the memory unit and the display area for the search result of the server according to a screen image shown when the content search instruction is received during the receiving step.

6. A computer program embedded on a non-transitory computer-readable recording medium, comprising:
a module configured to connect to a server;
a module configured to receive a content search instruction;
a module configured to search a memory unit for storing content data and to allow the connected server to perform a search, in accordance with the received search instruction; and
a module configured to generate a first screen image for displaying content in the memory unit or a second screen image for displaying content stored in the server, determine a display area for a search result of the memory unit and a display area for the search result of the server according to a screen image shown when the search instruction is received, and display a search result of the memory unit and a search result of the server in different display areas,
wherein the module configured to receive operates to receive the content search instruction when the first screen image or the second screen image is being displayed, and
wherein the module configured to determine operates to determine the display area for the search result of the memory unit and the display area for the search result of the server according to a screen image shown when the content search instruction is received by the module configured to receive.

7. A non-transitory computer-readable recording medium having embodied thereon the program according to claim 6.

* * * * *